United States Patent
Dussan et al.

(10) Patent No.: US 10,641,897 B1
(45) Date of Patent: May 5, 2020

(54) LADAR SYSTEM AND METHOD WITH ADAPTIVE PULSE DURATION

(71) Applicant: AEYE, Inc., Fairview Heights, IL (US)

(72) Inventors: Luis Carlos Dussan, Dublin, CA (US); Allan Steinhardt, Brentwood, CA (US); Jordan Spencer Greene, Novato, CA (US); Allen Chi-Luen Wang, Pleasanton, CA (US); Nitin Vyas, Pleasanton, CA (US); Daryoosh Rejaly, Mountain House, CA (US)

(73) Assignee: AEYE, INC., Belleville, IL (US)

( * ) Notice: Subject to any disclaimer, the term of this patent is extended or adjusted under 35 U.S.C. 154(b) by 0 days.

(21) Appl. No.: 16/407,544

(22) Filed: May 9, 2019

Related U.S. Application Data

(60) Provisional application No. 62/837,767, filed on Apr. 24, 2019.

(51) Int. Cl.
  G01S 17/26 (2020.01)
  G01S 7/481 (2006.01)
  G01S 17/89 (2020.01)

(52) U.S. Cl.
  CPC ............ G01S 17/26 (2020.01); G01S 7/4811 (2013.01); G01S 17/89 (2013.01)

(58) Field of Classification Search
  None
  See application file for complete search history.

(56) References Cited

U.S. PATENT DOCUMENTS

| | | | |
|---|---|---|---|
| 3,443,502 A | 5/1969 | Harvey | |
| 4,555,627 A | 11/1985 | McRae, Jr. | |
| 4,579,430 A | 4/1986 | Bille | |
| 5,221,928 A * | 6/1993 | Dahl | G01S 7/34 342/174 |
| 5,231,401 A | 7/1993 | Kaman et al. | |
| 5,231,480 A * | 7/1993 | Ulich | G01S 17/89 348/31 |
| 5,528,354 A | 6/1996 | Uwira | |

(Continued)

FOREIGN PATENT DOCUMENTS

| CN | 103885065 A | 6/2014 |
|---|---|---|
| WO | 2004034084 A1 | 4/2004 |

(Continued)

OTHER PUBLICATIONS

"Compressed Sensing," Wikipedia, 2019, downloaded Jun. 22, 2019 from https://en.wikipedia.org/wiki/Compressed_sensing, 16 pgs.

(Continued)

*Primary Examiner* — Hovhannes Baghdasaryan
(74) *Attorney, Agent, or Firm* — Thompson Coburn LLP

(57) ABSTRACT

A ladar system and related method are disclosed where the ladar system includes a sensor that senses background light levels. A control circuit of the ladar system (1) measures the sensed background light levels and (2) controllably adjusts a pulse duration for a new ladar pulse based on the measured background light levels. A ladar transmitter can then transmit the new ladar pulse, wherein the new ladar pulse has the adjusted pulse duration. In an example embodiment, this technique for adaptive pulse duration can be employed in the ladar system where the ladar transmitter and ladar receiver are arranged in a bistatic architecture.

52 Claims, 14 Drawing Sheets

(56) References Cited

U.S. PATENT DOCUMENTS

| | | | |
|---|---|---|---|
| 5,552,893 A | 9/1996 | Akasu | |
| 5,625,644 A | 4/1997 | Myers | |
| 5,638,164 A | 6/1997 | Landau | |
| 5,808,775 A | 9/1998 | Inagaki et al. | |
| 5,815,250 A | 9/1998 | Thomson et al. | |
| 5,831,719 A | 11/1998 | Berg et al. | |
| 5,880,836 A * | 3/1999 | Lonnqvist | G01S 17/95 |
| | | | 356/336 |
| 6,031,601 A | 2/2000 | McCusker et al. | |
| 6,091,335 A * | 7/2000 | Breda | B64D 15/20 |
| | | | 244/134 F |
| 6,205,275 B1 | 3/2001 | Melville | |
| 6,245,590 B1 | 6/2001 | Wine et al. | |
| 6,288,816 B1 | 9/2001 | Melville et al. | |
| 6,847,462 B1 | 1/2005 | Kacyra et al. | |
| 6,926,227 B1 | 8/2005 | Young et al. | |
| 6,967,617 B1 | 11/2005 | McMillan et al. | |
| 7,038,608 B1 | 5/2006 | Gilbert | |
| 7,072,039 B2 * | 7/2006 | Dobbs | G01J 3/447 |
| | | | 356/364 |
| 7,206,063 B2 | 4/2007 | Anderson et al. | |
| 7,236,235 B2 | 6/2007 | Dimsdale | |
| 7,436,494 B1 | 10/2008 | Kennedy et al. | |
| 7,701,558 B2 | 4/2010 | Walsh et al. | |
| 7,800,736 B2 | 9/2010 | Pack et al. | |
| 7,894,044 B1 | 2/2011 | Sullivan | |
| 7,944,548 B2 | 5/2011 | Eaton | |
| 8,072,663 B2 | 12/2011 | O'Neill et al. | |
| 8,081,301 B2 | 12/2011 | Stann et al. | |
| 8,120,754 B2 | 2/2012 | Kaehler | |
| 8,228,579 B2 | 7/2012 | Sourani | |
| 8,427,657 B2 | 4/2013 | Milanovi | |
| 8,635,091 B2 | 1/2014 | Amigo et al. | |
| 8,681,319 B2 | 3/2014 | Tanaka et al. | |
| 8,797,550 B2 | 8/2014 | Hays et al. | |
| 8,810,796 B2 | 8/2014 | Hays et al. | |
| 8,866,322 B2 | 10/2014 | Tchoryk, Jr. et al. | |
| 8,892,569 B2 | 11/2014 | Bowman et al. | |
| 8,896,818 B2 | 11/2014 | Walsh et al. | |
| 9,069,061 B1 | 6/2015 | Harwit | |
| 9,085,354 B1 | 7/2015 | Peeters et al. | |
| 9,086,488 B2 | 7/2015 | Tchoryk, Jr. et al. | |
| 9,116,243 B1 * | 8/2015 | Brown | G01S 17/95 |
| 9,128,190 B1 | 9/2015 | Ulrich et al. | |
| 9,261,881 B1 | 2/2016 | Ferguson et al. | |
| 9,278,689 B1 | 3/2016 | Delp | |
| 9,285,477 B1 | 3/2016 | Smith et al. | |
| 9,305,219 B2 | 4/2016 | Ramalingam et al. | |
| 9,315,178 B1 | 4/2016 | Ferguson et al. | |
| 9,336,455 B1 | 5/2016 | Withers et al. | |
| 9,360,554 B2 | 6/2016 | Retterath et al. | |
| 9,383,753 B1 | 7/2016 | Templeton et al. | |
| 9,423,484 B2 | 8/2016 | Aycock et al. | |
| 9,437,053 B2 | 9/2016 | Jenkins et al. | |
| 9,516,244 B2 | 12/2016 | Borowski | |
| 9,575,184 B2 | 2/2017 | Gilliland et al. | |
| 9,581,967 B1 | 2/2017 | Krause | |
| 9,841,495 B2 | 12/2017 | Campbell et al. | |
| 9,885,778 B2 | 2/2018 | Dussan | |
| 9,897,687 B1 | 2/2018 | Campbell et al. | |
| 9,897,689 B2 | 2/2018 | Dussan | |
| 9,933,513 B2 | 4/2018 | Dussan et al. | |
| 9,958,545 B2 | 5/2018 | Eichenholz et al. | |
| 10,007,001 B1 | 6/2018 | LaChapelle et al. | |
| 10,042,043 B2 | 8/2018 | Dussan | |
| 10,042,159 B2 | 8/2018 | Dussan et al. | |
| 10,073,166 B2 | 9/2018 | Dussan | |
| 10,078,133 B2 | 9/2018 | Dussan | |
| 10,088,558 B2 | 10/2018 | Dussan | |
| 10,108,867 B1 | 10/2018 | Vallespi-Gonzalez et al. | |
| 10,185,028 B2 | 1/2019 | Dussan et al. | |
| 10,209,349 B2 | 2/2019 | Dussan et al. | |
| 10,215,848 B2 | 2/2019 | Dussan | |
| 10,282,591 B2 | 5/2019 | Lindner et al. | |
| 2002/0060784 A1 | 5/2002 | Pack et al. | |
| 2002/0176067 A1 | 11/2002 | Charbon | |
| 2003/0122687 A1 | 7/2003 | Trajkovic et al. | |
| 2003/0151542 A1 | 8/2003 | Steinlechner et al. | |
| 2004/0130702 A1 * | 7/2004 | Jupp | G01S 7/497 |
| | | | 356/5.01 |
| 2005/0057654 A1 | 3/2005 | Byren | |
| 2005/0216237 A1 | 9/2005 | Adachi et al. | |
| 2006/0007362 A1 | 1/2006 | Lee et al. | |
| 2006/0054782 A1 * | 3/2006 | Olsen | H04N 13/214 |
| | | | 250/208.1 |
| 2006/0176468 A1 | 8/2006 | Anderson et al. | |
| 2006/0197936 A1 | 9/2006 | Liebman et al. | |
| 2006/0227315 A1 | 10/2006 | Beller | |
| 2006/0265147 A1 | 11/2006 | Yamaguchi et al. | |
| 2008/0136626 A1 | 6/2008 | Hudson et al. | |
| 2008/0159591 A1 | 7/2008 | Ruedin | |
| 2009/0059201 A1 | 3/2009 | Willner et al. | |
| 2009/0128864 A1 | 5/2009 | Inage | |
| 2009/0242468 A1 | 10/2009 | Corben et al. | |
| 2009/0292468 A1 | 11/2009 | Wu et al. | |
| 2010/0027602 A1 | 2/2010 | Abshire et al. | |
| 2010/0053715 A1 | 3/2010 | O'Neill et al. | |
| 2010/0141527 A1 * | 6/2010 | Lalezari | H01Q 21/08 |
| | | | 342/368 |
| 2010/0165322 A1 * | 7/2010 | Kane | G01S 7/481 |
| | | | 356/4.01 |
| 2010/0204964 A1 | 8/2010 | Pack et al. | |
| 2011/0019188 A1 | 1/2011 | Ray et al. | |
| 2011/0043785 A1 | 2/2011 | Cates et al. | |
| 2011/0066262 A1 | 3/2011 | Kelly et al. | |
| 2011/0085155 A1 | 4/2011 | Stann et al. | |
| 2011/0097014 A1 | 4/2011 | Lin | |
| 2011/0146908 A1 | 6/2011 | Kobayashi et al. | |
| 2011/0149268 A1 | 6/2011 | Marchant et al. | |
| 2011/0149360 A1 | 6/2011 | Sourani | |
| 2011/0153367 A1 | 6/2011 | Amigo et al. | |
| 2011/0224840 A1 * | 9/2011 | Vanek | G01S 17/58 |
| | | | 701/1 |
| 2011/0260036 A1 | 10/2011 | Baraniuk et al. | |
| 2011/0282622 A1 | 11/2011 | Canter | |
| 2011/0317147 A1 | 12/2011 | Campbell et al. | |
| 2012/0038817 A1 | 2/2012 | McMackin et al. | |
| 2012/0044093 A1 | 2/2012 | Pala | |
| 2012/0044476 A1 | 2/2012 | Earhart et al. | |
| 2012/0050750 A1 | 3/2012 | Hays et al. | |
| 2012/0075432 A1 | 3/2012 | Bilbrey et al. | |
| 2012/0169053 A1 | 7/2012 | Tchoryk, Jr. et al. | |
| 2012/0236379 A1 * | 9/2012 | da Silva | G01S 7/4817 |
| | | | 359/200.8 |
| 2012/0249996 A1 | 10/2012 | Tanaka et al. | |
| 2012/0257186 A1 | 10/2012 | Rieger et al. | |
| 2012/0274937 A1 | 11/2012 | Hays et al. | |
| 2013/0314694 A1 | 11/2013 | Tchoryk, Jr. et al. | |
| 2014/0021354 A1 | 1/2014 | Gagnon et al. | |
| 2014/0022539 A1 | 1/2014 | France | |
| 2014/0078514 A1 | 3/2014 | Zhu | |
| 2014/0152974 A1 | 6/2014 | Ko | |
| 2014/0211194 A1 | 7/2014 | Pacala et al. | |
| 2014/0291491 A1 | 10/2014 | Shpunt et al. | |
| 2014/0300732 A1 | 10/2014 | Friend et al. | |
| 2014/0350836 A1 | 11/2014 | Stettner et al. | |
| 2014/0368651 A1 | 12/2014 | Irschara et al. | |
| 2015/0065803 A1 | 3/2015 | Douglas et al. | |
| 2015/0081211 A1 | 3/2015 | Zeng et al. | |
| 2015/0153452 A1 | 6/2015 | Yamamoto et al. | |
| 2015/0269439 A1 | 9/2015 | Versace et al. | |
| 2015/0304634 A1 | 10/2015 | Karvounis | |
| 2015/0308896 A1 | 10/2015 | Darty | |
| 2015/0331113 A1 | 11/2015 | Stettner et al. | |
| 2015/0369920 A1 | 12/2015 | Setono et al. | |
| 2015/0378011 A1 | 12/2015 | Owechko | |
| 2015/0378187 A1 | 12/2015 | Heck et al. | |
| 2016/0003946 A1 | 1/2016 | Gilliland et al. | |
| 2016/0005229 A1 | 1/2016 | Lee et al. | |
| 2016/0041266 A1 | 2/2016 | Smits | |
| 2016/0047895 A1 | 2/2016 | Dussan | |
| 2016/0047896 A1 | 2/2016 | Dussan | |
| 2016/0047897 A1 | 2/2016 | Dussan | |
| 2016/0047898 A1 | 2/2016 | Dussan | |

(56) References Cited

U.S. PATENT DOCUMENTS

| | | |
|---|---|---|
| 2016/0047899 A1 | 2/2016 | Dussan |
| 2016/0047900 A1 | 2/2016 | Dussan |
| 2016/0047903 A1 | 2/2016 | Dussan |
| 2016/0146595 A1 | 5/2016 | Boufounos et al. |
| 2016/0157828 A1 | 6/2016 | Sumi et al. |
| 2016/0274589 A1 | 9/2016 | Templeton et al. |
| 2016/0293647 A1 | 10/2016 | Lin et al. |
| 2016/0320486 A1 | 11/2016 | Murai et al. |
| 2016/0379094 A1 | 12/2016 | Mittal et al. |
| 2017/0158239 A1 | 6/2017 | Dhome et al. |
| 2017/0199280 A1 | 7/2017 | Nazemi et al. |
| 2017/0205873 A1 | 7/2017 | Shpunt et al. |
| 2017/0211932 A1 | 7/2017 | Zadravec et al. |
| 2017/0219695 A1 | 8/2017 | Hall et al. |
| 2017/0234973 A1 | 8/2017 | Axelsson |
| 2017/0242102 A1 | 8/2017 | Dussan et al. |
| 2017/0242103 A1 | 8/2017 | Dussan |
| 2017/0242104 A1 | 8/2017 | Dussan |
| 2017/0242105 A1 | 8/2017 | Dussan et al. |
| 2017/0242106 A1 | 8/2017 | Dussan et al. |
| 2017/0242107 A1 | 8/2017 | Dussan et al. |
| 2017/0242108 A1* | 8/2017 | Dussan ............... G01S 7/4863 |
| 2017/0242109 A1 | 8/2017 | Dussan et al. |
| 2017/0263048 A1 | 9/2017 | Glaser et al. |
| 2017/0269197 A1 | 9/2017 | Hall et al. |
| 2017/0269198 A1 | 9/2017 | Hall et al. |
| 2017/0269209 A1 | 9/2017 | Hall et al. |
| 2017/0269215 A1 | 9/2017 | Hall et al. |
| 2017/0307876 A1 | 10/2017 | Dussan et al. |
| 2018/0011174 A1 | 1/2018 | Miles et al. |
| 2018/0031703 A1 | 2/2018 | Ngai et al. |
| 2018/0075309 A1 | 3/2018 | Sathyanarayana et al. |
| 2018/0081034 A1 | 3/2018 | Guo |
| 2018/0100928 A1* | 4/2018 | Keilaf ............... G01S 17/936 |
| 2018/0120436 A1 | 5/2018 | Smits |
| 2018/0137675 A1 | 5/2018 | Kwant et al. |
| 2018/0143300 A1 | 5/2018 | Dussan |
| 2018/0143324 A1 | 5/2018 | Keilaf et al. |
| 2018/0156895 A1 | 6/2018 | Hinderling et al. |
| 2018/0188355 A1 | 7/2018 | Bao et al. |
| 2018/0224533 A1 | 8/2018 | Dussan et al. |
| 2018/0238998 A1 | 8/2018 | Dussan et al. |
| 2018/0239000 A1 | 8/2018 | Dussan et al. |
| 2018/0239001 A1 | 8/2018 | Dussan et al. |
| 2018/0239004 A1 | 8/2018 | Dussan et al. |
| 2018/0239005 A1 | 8/2018 | Dussan et al. |
| 2018/0268246 A1 | 9/2018 | Kondo et al. |
| 2018/0284234 A1 | 10/2018 | Curatu |
| 2018/0284278 A1 | 10/2018 | Russell et al. |
| 2018/0284279 A1 | 10/2018 | Campbell et al. |
| 2018/0299534 A1 | 10/2018 | LaChapelle et al. |
| 2018/0306905 A1 | 10/2018 | Kapusta et al. |
| 2018/0306927 A1 | 10/2018 | Slutsky et al. |
| 2018/0341103 A1 | 11/2018 | Dussan et al. |
| 2019/0025407 A1 | 1/2019 | Dussan |
| 2019/0041521 A1 | 2/2019 | Kalscheur et al. |
| 2019/0086514 A1 | 3/2019 | Dussan et al. |
| 2019/0086550 A1 | 3/2019 | Dussan et al. |
| 2019/0113603 A1 | 4/2019 | Wuthishuwong et al. |
| 2019/0116355 A1 | 4/2019 | Schmidt et al. |
| 2019/0154439 A1 | 5/2019 | Binder |
| 2019/0180502 A1 | 6/2019 | Englard et al. |

FOREIGN PATENT DOCUMENTS

| | | |
|---|---|---|
| WO | 2006/076474 A1 | 7/2006 |
| WO | 2008008970 A2 | 1/2008 |
| WO | 2016025908 A2 | 2/2016 |
| WO | 2017/143183 A1 | 8/2017 |
| WO | 2017/143217 A1 | 8/2017 |
| WO | 2018/152201 A1 | 8/2018 |
| WO | 2019010425 A1 | 1/2019 |

OTHER PUBLICATIONS

"Entrance Pupil," Wikipedia, 2016, downloaded Jun. 22, 2019 from https://enwikipedia.org/wiki/Entrance_pupil, 2 pgs.

Analog Devices, "Data Sheet AD9680", 98 pages, 2014-2015.

Chen et al., "Estimating Depth from RGB and Sparse Sensing", European Conference on Computer Vision, Springer, 2018, pp. 176-192.

Donoho, "Compressed Sensing", IEEE Transactions on Inmformation Theory, Apr. 2006, vol. 52, No. 4, 18 pgs.

Howland et al., "Compressive Sensing LIDAR for 3D Imaging", Optical Society of America, May 1-6, 2011, 2 pages.

Kessler, "An afocal beam relay for laser XY scanning systems", Proc. of SPIE vol. 8215, 9 pages, 2012.

Kim et al., "Investigation on the occurrence of mutual interference between pulsed terrestrial LIDAR scanners", 2015 IEEE Intelligent Vehicles Symposium (IV), Jun. 28-Jul. 1, 2015, COEX, Seoul, Korea, pp. 437-442.

Maxim Integrated Products, Inc., Tutorial 800, "Design a Low-Jitter Clock for High Speed Data Converters", 8 pages, Jul. 17, 2002.

Meinhardt-Llopis et al, "Horn-Schunk Optical Flow with a Multi-Scale Strategy", Image Processing Online, Jul. 19, 2013, 22 pages.

Moss et al, "Low-cost compact MEMS scanning LADAR system for robotic applications", Proc. of SPIE, 2012, vol. 8379, 837903-1 to 837903-9.

Office Action for U.S. Appl. No. 16/407,570 dated Jul. 31, 2019.

Office Action for U.S. Appl. No. 16/407,589 dated Jul. 29, 2019.

Office Action for U.S. Appl. No. 16/407,615 dated Jul. 23, 2019.

Redmayne et al., "Understanding the Effect of Clock Jitter on High Speed ADCs", Design Note 1013, Linear Technology, 4 pages, 2006.

Rehn, "Optical properties of elliptical reflectors", Opt. Eng. 43(7), pp. 1480-1488, Jul. 2004.

Sharafutdinova et al., "Improved field scanner incorporating parabolic optics. Part 1: Simulation", Applied Optics, vol. 48, No. 22, p. 4389-4396, Aug. 2009.

* cited by examiner

LADAR SYSTEM AND METHOD WITH ADAPTIVE PULSE DURATION

CROSS-REFERENCE AND PRIORITY CLAIM TO RELATED PATENT APPLICATIONS

This patent application claims priority to U.S. provisional patent application Ser. No. 62/837,767, filed Apr. 24, 2019, and entitled "Agile Bistatic Ladar System and Method", the entire disclosure of which is incorporated herein by reference.

This patent application is also related to (1) U.S. patent application Ser. No. 16/407,558, filed this same day, and entitled "Agile Bistatic Ladar System and Method", (2) U.S. patent application Ser. No. 16/407,570, filed this same day, and entitled "Ladar System and Method with Frequency Domain Shuttering", (3) U.S. patent application Ser. No. 16/407,589, filed this same day, and entitled "Ladar System and Method with Polarized Receivers", (4) U.S. patent application Ser. No. 16/407,598, filed this same day, and entitled "Ladar System and Method with Multi-Dimensional Point Cloud Data Including Polarization-Specific Data", (5) U.S. patent application Ser. No. 16/407,615, filed this same day, and entitled "Ladar System and Method with Polarization Camera for Augmenting Point Cloud Data", and (6) U.S. patent application Ser. No. 16/407,626, filed this same day, and entitled "Ladar System and Method with Cross-Receiver", the entire disclosures of each of which are incorporated herein by reference.

INTRODUCTION

The inventors describe improved ladar systems and methods, including improved bistatic ladar systems. As used herein, the term "ladar" refers to and encompasses any of laser radar, laser detection and ranging, and light detection and ranging ("lidar"). With a bistatic ladar system, the system's ladar transmitter and ladar receiver are not commonly bore-sited. Accordingly, with a bistatic ladar system, there is an offset of the ladar transmitter relative to the ladar receiver such that the ladar transmitter and the ladar receiver are non-coaxial in terms of their gaze.

Vehicles may employ ladar systems to support autonomous operation and/or driver-assistance, such as advanced driver-assistance systems (ADAS) to detect obstacles that may be nearby or in the vehicle's path. Such vehicles may be airborne vehicles, ground vehicles, or sea-based vehicles. Effective ladar systems for vehicles rely on rapid detection, characterization of, and response to, dynamic obstacles. Toward this end, reduced latency is beneficial for ladar systems because low latency generally translates to improved safety for ladar-equipped vehicles.

For example, at highway speeds, the closing distance between two approaching vehicles can exceed 200 km/hour. This maps to 50 m/sec. A 10 Hz scanning ladar system with a requirement for 10 detections requires 1 second just to collect sufficient data to confidently declare the presence of an unsafe approaching vehicle. This means that by the time the ladar system is able to declare the presence of the unsafe approaching vehicle, that unsafe vehicle is now about 150 feet closer.

The inventors disclose ladar systems and methods that use any of (1) pulse duration agility to mitigate background noise, (2) polarization diversity to minimize sidelobe leakage from the returns produced by retroreflective objects, and/or (3) a cross-receiver with linear arrays to isolate interference. One or more of these improvements can be incorporated into bistatic ladar systems to improve the performance of such bistatic ladar systems. A receiver in a bistatic ladar system allows for a (nearly) arbitrarily large receive aperture and longer dwell on receive, while still retaining a small transmit aperture. This enables a practitioner to simultaneously enjoy highly agile transmit while still being capable of low light detection. A small transmit aperture implies small mass and hence small momentum for scanning components—and hence small momentum and ultimately high speed agile gaze scan. Furthermore, a large receive aperture allows for low light detection by increasing the noise equivalent power (NEP) to flux ratio. However, the increased collection size (aperture) and collection time (dwell) results in increased sensitivity to interference (be it from retroreflectors and/or background light) relative to systems where the transmitter and receiver are coaxial. Through the techniques described herein, sensitivity to interference can be mitigated to provide a bistatic ladar system with performance benefits similar to a coaxial system.

The techniques disclosed herein can be advantageously applied to bistatic ladar systems where the ladar receivers employ either imaging optics or non-imaging optics. With imaging optics, the ladar system employs lenses which focus light that is incident on the receiver onto an imaging focal plane akin to a camera. With non-imaging optics (e.g., a compound parabolic light collector or a fiber taper), light is collected but no image is formed. The inventors believe that the techniques described herein can be particularly advantageous when used with non-imaging ladar receivers. Imaging receivers typically provide better mitigation of background clutter and other interference, but are intrinsically costlier than non-imaging receivers—largely due to multi-channel receiver requirements (ROIC). The technical innovations described herein relating to agile pulse duration, polarization diversity, and/or a cross-receiver can close the gap in cost and performance for non-imaging receivers vis a vis imaging receivers. Furthermore, these innovations can be mutually reinforcing when combined together, which can lead to even greater performance improvements.

In an example embodiment, the inventors disclose a ladar system that employs a variable duration pulse on transmit. With this example embodiment, pulse duration is adapted based on measured background light. The system senses the background light level from prior ladar returns and adjusts the pulse duration for new ladar pulse shots accordingly.

In another example embodiment, the inventors disclose a ladar system that employs polarization diversity on receive. With this example embodiment, dual channel receivers can be used to measure incident polarization for each ladar return. The system can then use a known polarity on transmit for the ladar pulses to separate returns corresponding to retroreflectors from returns corresponding to standard objects (e.g., Lambertian). Retroreflective returns can be classified as specular or quasi-specular in nature, while non-retroreflective returns can be classified as Lambertian in nature.

In another example embodiment, the inventors disclose a ladar system where two one-dimensional (1D) receive arrays are arranged at different angles (e.g., a cross pattern) in order to create a two dimensional isolation of desired signal returns from interference. By employing 1D arrays, the system can greatly simplify cost and complexity.

Further still, the inventors disclose example embodiments where the ladar system employs two or more of any combination of variable pulse duration on transmit, polarization diversity on receive, and cross-receivers to isolate interference.

Further still, the inventors disclose herein a variety of additional technical innovations, including but not limited to techniques for frequency domain shuttering, polarization-based point cloud augmentation, polarization-based rich data sets, and others.

These and other features and advantages of the present invention will be described hereinafter to those having ordinary skill in the art.

DETAILED DESCRIPTION OF EXAMPLE EMBODIMENTS

Discussed below are example embodiments of ladar systems that employ (1) adaptive pulse duration where the duration of the ladar pulses is adjusted as a function of measured background light (2) polarization diversity in the ladar receiver to improve detection capabilities, and (3) a cross-receiver to isolate interference. For ease of discussion, these features will be separately discussed with reference to example embodiments. However, it should be understood that a practitioner may choose to incorporate any or all of these technical innovations into the same ladar system if desired.

I. Adaptive Pulse Duration

Figure 1A:
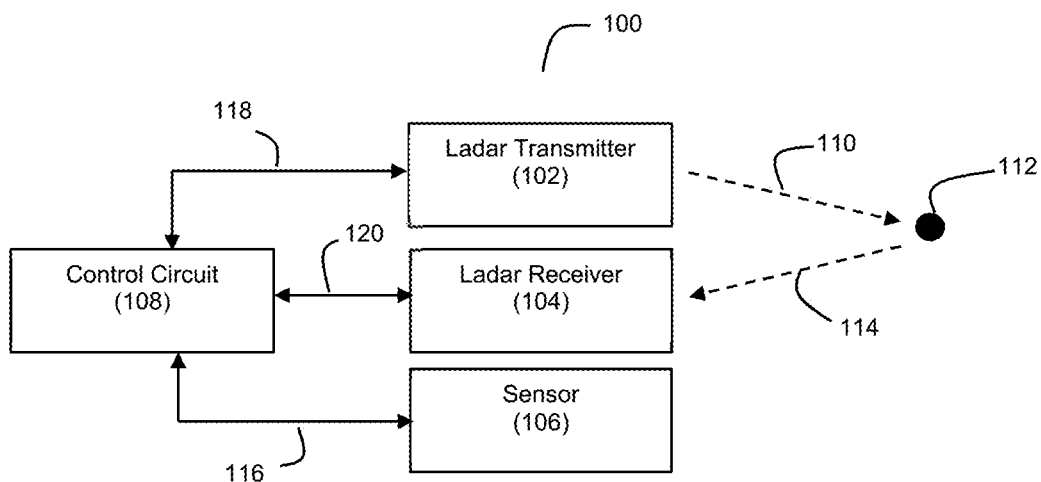
FIG. 1A depicts an example ladar system for an example embodiment.

FIG. 1A depicts an example ladar system 100 that can be used to adapt the duration of ladar pulses as a function of incident background light. The system 100 can employ a bistatic ladar transmitter 102 and ladar receiver 104. As an example, the ladar receiver 104 can be spatially offset from the ladar transmitter in a range between +30 to −30 degrees in the azimuth direction. Generally speaking, it is desirable for the degree of offset to equal the scan range of the ladar transmitter 102 so that the ladar receiver 104 will always "catch" the light from the transmitter 102 wherever the ladar transmitter 102 happens to be pointing. So, in this example, it would be desirable for the ladar transmitter 102 to scan across a 60 degree angular range (−30 to +30 degrees). Any extra, unneeded, angular extent in the ladar receiver 104 can be undesirable in that it would allow in additional interfering light while not helping with pulse capture; and any less angular extent would blind the ladar receiver 104 with respect to some ladar pulse returns. In this discussion, for purposes of simplicity, it will be assumed that the ladar transmitter 102 scans only in azimuth (horizontally) and not in elevation (vertically). But, for 2D scans that same principles apply and the ladar receiver 104 can be positioned accordingly.

Ladar transmitter 102 can be configured to transmit ladar pulses 110 toward a range point 112 to support range detection with respect to such range point 112. The range point 112 will reflect the incident pulse 110 to produce a ladar pulse return 114 that is received by ladar receiver 104.

The ladar transmitter 102 can be a scanning ladar transmitter if desired by a practitioner. As examples, the ladar transmitter 102 can employ technology as described in U.S. Pat. No. 10,078,133, the entire disclosure of which is incorporated herein by reference. This incorporated patent describes, inter alia, ladar transmitters that can employ compressive sensing to intelligent select and target range points for interrogation via ladar pulses 110.

The ladar receiver 104 can include one or more photo-receivers to convert incident light (which may include ladar pulse returns 114) into a signal 120 that is indicative of the ladar pulse returns 114 so that range information (and intensity information) for the range point 112 can be determined. Examples of commercially available photo-receivers that can be used in the ladar receiver 104 include diode detectors, thermopile detectors, linear avalanche detectors, and single photon avalanche detectors (SPADs). As examples, the ladar receiver 104 can employ technology as described in U.S. Pat. Nos. 9,933,513 and 10,185,028, the entire disclosures of each of which are incorporated by reference. These incorporated patents describe, inter alia, ladar receivers that can selectively activate regions of a photodetector array for improved noise reduction when sensing ladar pulse returns 114.

Also, in an example embodiment, the ladar receiver 104 can be shot noise limited (e.g., with respect to Johnson noise and dark current exceeded by shot levels). There are five types of noise/interference sources in a ladar system: (i) Johnson noise (electronic noise from amplification and conductance), (ii) dark current (spontaneous current flow in the detector in the absence of light), (iii) background light which appears as shot noise, (iv) ladar pulse return shot noise and (v) interference from other ladar or retroreflectors leaking in through sidelobes. Example embodiments discussed herein are focused on reducing (iii) and (v) (background light and interference). Both of these types of noise differ in terms of angle of arrival and/or polarization. Detection of ladar returns 114 can be extant above the initial background clutter and shot noise background levels as discussed below or they may be below these levels; but we will assume that the noise sources (i), (ii), and (iv) discussed above have been adequately and prudently suppressed to below the ladar returns using existing knowledge in the art. Further, in an example embodiment, the ladar receiver 104 can have a receiver aperture whose diffraction limit is less than the beam-waist of the ladar transmitter 102 (e.g., the aperture is at least 20× larger than the ladar transmitter 102's spot size (i.e., effective aperture which determines 102's beam-waist).

The example system 100 of FIG. 1A may also employ a sensor 106 that senses passive incident light impinging on the system 100. This passive incident light can be light that is not under control of the ladar system's laser. This sensed light can serve as the basis for measuring background light with respect to the system 100; and such knowledge can enhance noise suppression in the ladar system. As an example, sensor 106 can be a camera, such as camera capable of sensing incident visible light and/or infrared light, with or without polarization discrimination. Signal 116 produced by sensor 106 can be indicative of the background light that is incident on the sensor 106, regardless of whether the camera is in the same frequency band as the ladar system's own laser. This is because interference tends to be irrespective of the laser's exact frequency. For example, sunlight exists over a very broad range of light frequency, and varies with frequency in a manner known as the Planck spectral law. As such, one can reliably extrapolate from camera readings out of the laser band into the laser band.

Control circuit 108 can include circuitry for processing the background light signal 116 and computing an adjusted pulse duration for use by the ladar transmitter 102 with respect to a new ladar pulse 110 to be transmitted toward a range point 112. The adjusted pulse duration to be used for the new ladar pulse 110 can be communicated to the ladar transmitter 102 via control signal 118. The control circuit 108 may include a processor to facilitate the signal processing and computational tasks that are to performed by control circuit 108 for adjusting pulse duration as a function of detected background light. While any suitable processor capable of performing the operations described herein can be employed by control circuit 108, in an example embodiment, a field programmable gate array (FPGA) can be used due to its ability to perform tasks at low latency via the massive parallelization that is available via is programmable logic gates. The control circuit 108 may also be configured to process the signal 120 from the ladar receiver 104 to facilitate the extraction of range, intensity, and/or other information from signal 120. Control circuit 108 may include an analog-to-digital converter (ADC) for facilitating this extraction.

Figure 1B:
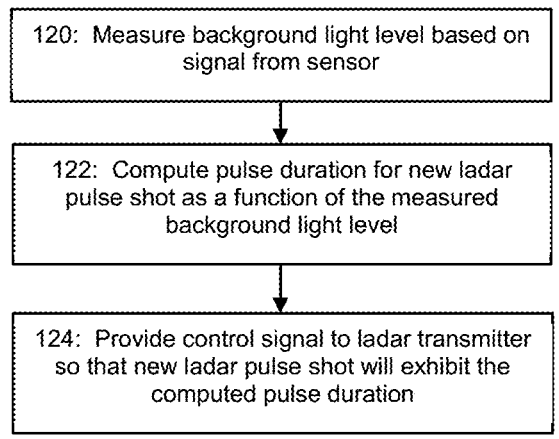
FIG. 1B depicts an example process flow for the example embodiment of FIG. 1A with respect to adapting the pulse duration as a function of measured background light.

FIG. 1B shows an example process flow that can be performed by control circuit 108 to adapt the pulse duration as a function of measured background light.

At step 120, the control circuit 108 measures a background light level based on signal 116 from sensor 106. This can be accomplished in any of a number of ways. Typically, the camera will have a shutter which controls exposure time; where the exposure time can be labeled as time T. Also, the camera will have an effective aperture (which can be labeled as A) and an optical bandwidth (which can be labeled as b); and the laser will have a bandwidth B. The passages below will describe an example embodiment for the case where the camera is a visible light camera without polarization; but the concepts can be readily extended to other types of cameras.

Example Process Flow for Step 120 Using a Passive Camera:
1) Read out the pixel array from the camera
2) Annotate each pixel according to the azimuth (Az) and elevation (el) of the shot list for the subject laser.
3) Using knowledge of T, A, b, calculate the level of light (measured in Watts per meter squared) incident upon the camera from each angle pair. This calculated level of light can be labeled as Q (Az, el), where $$Q(Az, el) = \frac{T\pi}{4} A^2 P_b(b) H(Az, El),$$

where $P_b(b)$ is the Planck spectrum integrated across the camera band, and H is the integrated point spread function of the camera lens. The reflectivity p is then found as the ratio of the measured light to this quantity Q.
4) Using the Planck spectrum formula and B, translate Q (Az, el) into Q' which represents the estimated background light, again in Watts per square meter incident on the ladar receiver 104, where $$Q'(Az, el) = \rho P_B(B) \frac{\pi}{4} A'^2 H'(Az, el),$$

where A',H' are the optical counterparts of those in 3) at the ladar wavelength. We assume here p is frequency invariant, but the general case is straight forward for a practitioner.

At step 122, the control circuit 108 computes a pulse duration for a new ladar pulse shot as a function of the measured background light level. The relationship between pulse duration and potential interference from background light results from the amount of time that the ladar receiver 104 will need to collect light in order to detect a ladar pulse return. Longer time spent collecting light for the ladar receiver 104 typically means that the light sensed by the ladar receiver 104 will suffer from more background clutter. Accordingly, at step 122, the control circuit 108 can operate to reduce pulse duration in situations where a bright background is detected by sensor 106 and increase pulse duration in situations where a dark background is detected by sensor 106. In an example where the pulse energy is kept relatively fixed from shot-to-shot, narrowing the pulse duration will translate to a higher amplitude pulse while lengthening the pulse duration will translate to a lower amplitude pulse. The higher amplitude/short duration pulse will allow for easier detection of the ladar pulse return 114 over the bright background light ambience. Therefore, we want pulse duration as short as possible to remove background light. But the use of the bistatic ladar receiver complicates this arrangement because the lower amplitude/long duration pulse will allow for less Johnson and dark current noise but will also have the deleterious effect of adding more background light. This is because a detector that handles shorter pulses will have relaxed (less) feedback resistance, in turn adding more Johnson and dark current. More precisely, for fixed energy per pulse in the laser, increasing pulse duration increases background noise with square root proportionality. The result is a net square root dependent loss in SNR. However, increasing pulse duration lowers Johnson noise bandwidth which leads to a square root noise decline, with another square root or more loss in noise from a decline in feedback resistance. The result is SNR parity at worst, and SNR gain, in general, from Johnson noise, with the opposite for background noise.

Thus to optimize bistatic detection, background light levels are assessed, and the ladar pulse (in the transmitter 102) and subsequent matched filter (in the receiver 104) are both tuned accordingly. Too short a pulse swamps the system in Johnson noise, and too long a pulse swamps the system in background clutter. The trade that is optimum places the background clutter below, or at least near, the Johnson noise, since otherwise less bandwidth would yield further SNR gain.

At step 124, the control circuit 108 provides control signal 124 to the ladar transmitter 102, where this control signal 124 includes a specification of the computed pulse duration from step 122. The computed pulse duration may be provided to the ladar transmitter along with a number of other parameters for use to control the scanning and firing of ladar pulses 110.

Figure 2:
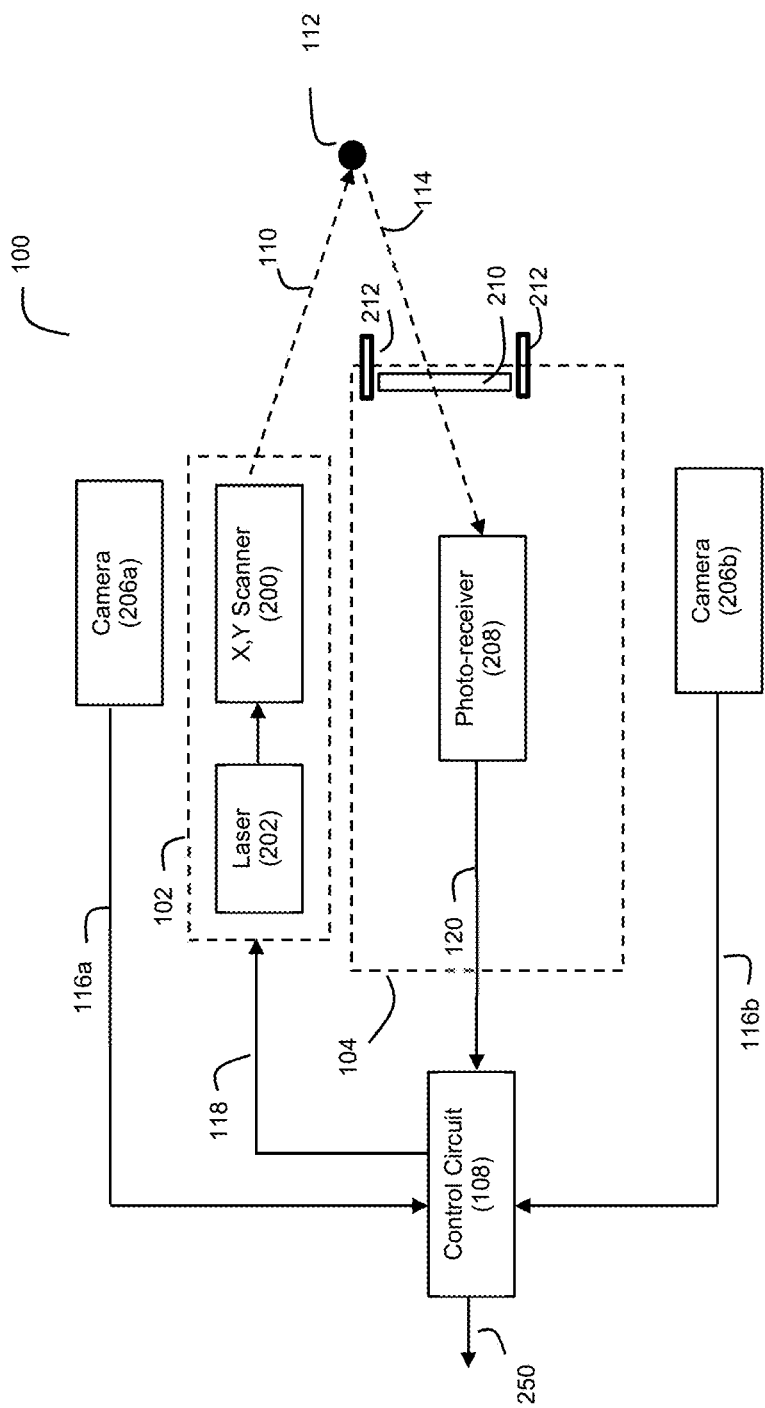
FIG. 2 depicts another example ladar system for adapting pulse duration as a function of measured background light.

FIG. 2 depicts another example ladar system 100 that can be used to adapt pulse duration as a function of measured background light. In the example of FIG. 2, the system 100 includes multiple sensors 106 in the form of cameras 206a and 206b. Furthermore, FIG. 2 shows ladar transmitter 102 as including a scanner 200 and laser 202. Scanner 202 may scan mirrors in order to direct ladar pulses from laser 202 toward targeted range points 112. Examples of ladar transmitters 102 that employ dynamic scanning to support compressive sensing are described in the above-referenced and incorporated patents and patent applications.

The bistatic architecture of FIG. 2 can be described by following the journey of a packet of light from creation to the scene and back again. To begin, we have a laser 202, which can be a pulsed laser (e.g., pumped fiber laser or diode-based laser). The wavelength can be arbitrary, but the 900 nm band is an attractive operating point, and provides ample range particularly for ADAS applications. In either case, the laser 202 can be configured to exhibit repeatable, predictable polarization orientation. This is intrinsic for diodes, but can be achieved for fiber lasers using feedback or polarization preserving fiber. Many vendors provide such lasers 202, examples of which include Excelitas, Hamamatsu, Thor Labs, and Keopsys. The following narrative refers to FIG. 1A.

Source:

The laser 202 can be in optical communication, by either free space or fiber coupling to a 2D scanner 200. The scanner 200 can employ an optical phased array, spatial light modulator, digital mirror device, galvometer, or MEMs device. The ladar transmitter 102 defined by the scanner-laser configuration can be flash or divergent limited. Many vendors provide such systems, examples of which include MTI, Fraunhoffer, BNS, and Meadowlark. The scanner 200 has an interface with the outside environment, where the interface may include an antireflectivity coated "first lens", possibly bandpass filtering (to avoid amplified spontaneous emission (ASE) and other leakage), and (if desired) a telescope. An example of a vendor of such systems include Edmond Optics. The ladar transmitter 102 can also include a pulse generator for the laser 202 that is responsive to a control signal from the control circuit 108 to control the pulse duration for the ladar pulses. Such a pulse generator can adjust pulse duration commensurate with an inter-pulse period between ladar pulses for the system 100.

Pulse Launch and Return (Variable Pulse Length, Short Range Coaxial Bistatics):

The photon packet 110 then arrives at a target (e.g., range point 112) in the environmental scene, through free space propagation and returns via free space propagation to the photo-receiver 208 of the ladar receiver 104. The front end of ladar receiver 104 may have receive optics 210. The receive optics 210 may include a concentrator such as a compound parabolic concentrator (available, for example, from Edmond) or may be comprised simply of a staring photodetector equipped with antireflective and bandpass coated material (available, for example, from Edmond, Thor), in which case cold stops 212 may be employed to limit background light in the receiver 104 from outside the field of view. The receive optics 210 may also include a bandpass optical filter that limits the light received by the photo-receiver 208. As an example, such a bandpass optical filter may have an acceptance wavelength width of 10 nm-100 nm.

The target 112 also injects passively derived incoherent light into cameras 206a and 206b. In this embodiment, the system employs two cameras 206a and 206b, so as to remove parallax and induce redundancy. This is preferred to direct optical co-bore siting with beam splitters and common optics, as disclosed in U.S. patent application Ser. No. 16/106,374, filed Aug. 21, 2018, and entitled "Ladar Receiver with Co-Bore Sited Camera" (the entire disclosure of which is incorporated herein by reference), when using 900 nm lasers, since the wavelength offset from visible is low. In an example embodiment, visible band color cameras can be used for cameras 206a, 206b. However, it should be understood that infrared, grey scale, and/or hyperspectral cameras could also be used for cameras 206a, 206b.

Figure 10A:
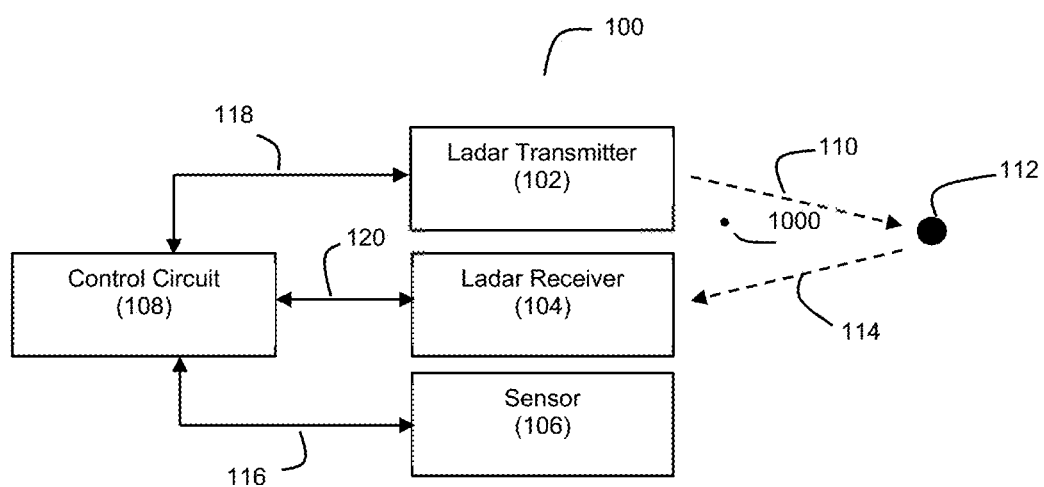
FIGS. 10A and 10B show example embodiments where it is desirable for the ladar system to include a near field coaxial receiver.

A drawback of the bistatic architecture is that objects very close to the ladar system 100 may not be visible to the ladar receiver 104. This is shown in FIG. 10A, where the target 112 is substituted by target 1000, which is so close to the ladar system 100 that it is "hiding" between the transmitter 102 and receiver 104. More precisely, the target 1000 is invisible to the ladar receiver 104 if the field of view of the ladar receiver 104 is such that it does not contain the angle between the normal incidence of the lens in the ladar receiver 104 and the line of sight between target 1000 and ladar receiver 104. This blind region is generally limited to a few feet, but in ADAS applications this can be an important region, especially when a car is stopped, since pedestrians might be in the blind zone. Conventionally, such blind spots are usually dealt with by using multiple, small, low cost auxiliary ladar systems. But, this solution has an attendant cost.

Figure 10B:
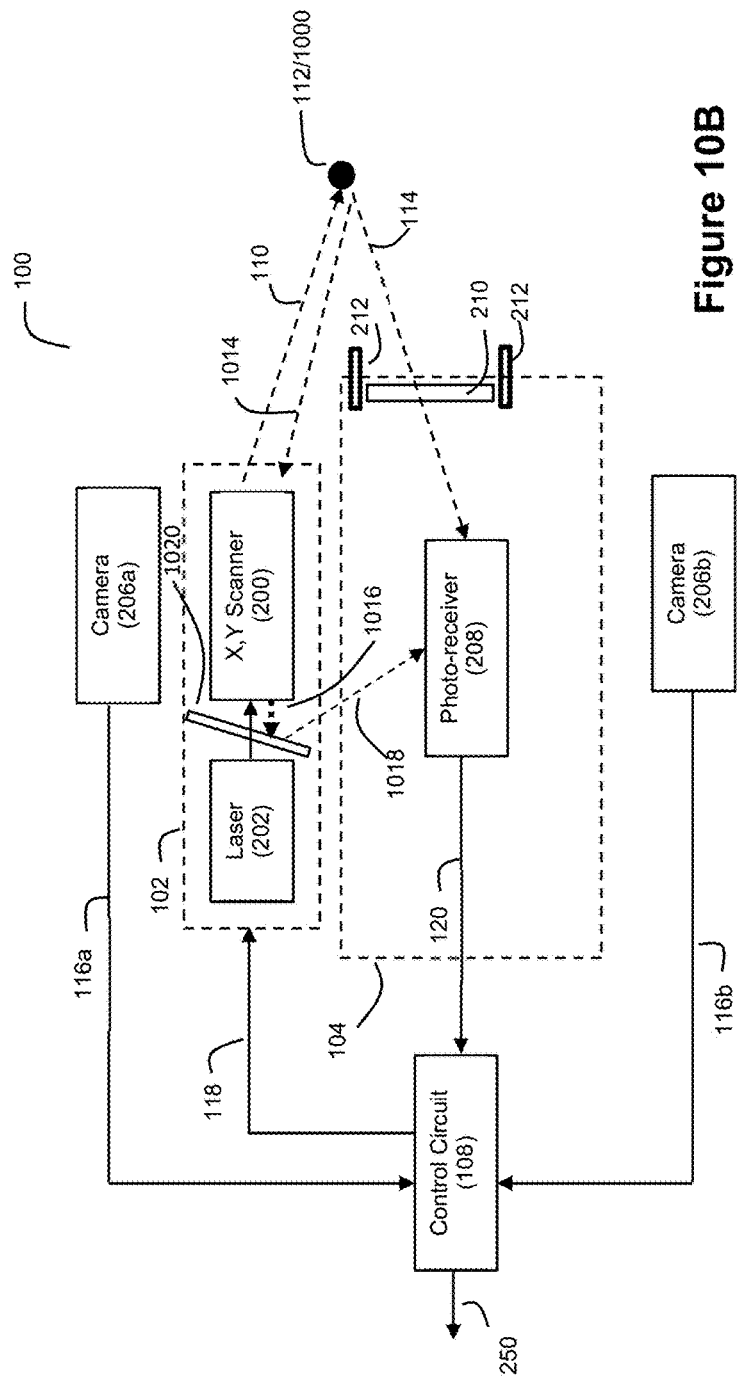

As an alternative to the conventional blind spot solution, a practitioner may wish to use the light returning onto the ladar transmitter 102 to remove this blind spot. As shown by FIG. 10B, it can be seen that some light will return to the scanner 200 from target 1000, as indicated by 1014. This assumes of course that target 1000 isn't blind to the transmitter itself. This is why in FIG. 10B we show the target 1000 as being located in a spot that is biased towards the ladar receiver 104. This light 1014 will then, by the principle of reciprocity, find its way back through scanner 200 toward the laser 202 as shown by 1016. FIG. 10B uses dashed lines to show return light paths to avoid ambiguity. The system includes a mirror 1020 placed in the optical path between the scanner 200 and laser 202 so that this return light 1016 is passed onto the photo receiver 208 via light path 1018. The mirror 1020 will be coated so that most of the incident light (nominally 98%) passes through—so most of the laser energy is passed unabated into the scanner 200, while some of the return light (nominally 2%) is realigned to the photo receiver 208. The fact that this path from target 1000 to photo receiver 208 via 1014, 200, 1016, 1020, and 1018 is so short is what allows us to have such a mirror 1020 with virtually no impact on the transmit path. The simplest way to build such a mirror 1020 is using a small amount of reflect metal on otherwise transparent glass. Such lenses can be purchased commercially from vendors such as Edmond Optics. We refer to the ladar receiver 104 that includes the light path 1014, 200, 1016, 1020, and 1018 as a "near field coaxial receiver". Note that we show in FIG. 10B the target object labeled as both 112 and 1000. This is because we want to emphasize an important consideration: it is possible that the near field coaxial receiver and the bistatic receiver may both pick up some signals. This may make it so that we wish to configure two separate photo receiver cells inside 208 so that the light paths 1018 and 114 fall upon distinct cells. Alternatively, one might wish to align the receiver 104 so that within the boundary of the blind zone the paths 114 and 1018 align in length so that there is no problematic "echo" that arises in the digital receiver chain from a single close in target. Finally note that it is possible, and perhaps desirable to replace the mirror in 1020, by a bidirectional, multimode, fiber-coupled receiver, using concepts described in "Monostatic All Fiber LADAR systems", Jeff Leach, PhD Dissertation, Catholic University of America, 2016, the entire disclosure of which is incorporated herein by reference.

Detection and Processing (Pulse Duration Control Using Background Light, Shuttering):

The photons, born in the laser 202, and journeying into the environment and back, end their brief lives at the photoreceiver 208, whereupon the give birth to electrons. Signal 120 produced by the ladar receiver 104 can be representative of the incident light on the photo-receiver 208, including any ladar pulse returns from the target 112. The goal in a non-imaging receiver is to drive down the background light as low as possible. This can be accomplished by a number of technologies such as large area avalanche photodiode (APD) modules (available, for example, from Hamamatsu), silicon photomultipliers and single photon avalanche diodes (SPADs) (available, for example, from Sensl, Ketex, First Sensor, Excelitas), or arrayed PINs (available, for example, from GPD).

The control circuit can interact with the cameras 206a, 206b and the ladar transmitter 102 to provide adaptive pulse duration. As noted above, such adaptive pulse duration can help improve, in real time, the SNR of the ladar system 100 by trading Johnson noise (which drops as the pulse widens) and background noise (which grows as the pulse widens).

Adaptive pulse duration can also help improve range resolution of the ladar system 100. In the absence of noise, the better the range resolution, the better the ladar system can measure the 3D position of each object, which in turn improves velocity estimations, improves shape and feature extraction, and reduces ambiguity between objects. For a given system bandwidth, the longer the pulse 110, the lower the range uncertainty (or the higher the range resolution) in a linearly dependent fashion. Ladar return pulses can be digitized, and then interpolation can be performed between successive digital samples. This allows for improved estimation of the range of the return. For example, if the time sequence of samples is {1,2,3,3,2,1}, it is safe to say the range peak is close to, or at, the time sample exactly between the two 3's in the set. In contrast if the time sequence of samples is {1,2,3,4,3}, it is safe to say the peak is at the time sample corresponding to the value 4 in the set. When ones applies this method, we find that the interpolation accuracy is, in theory, invariant to pulse length, but does depend on bandwidth, provided there is only one return from each laser shot fired. If there are multiple objects at a given azimuth and elevation there can be multiple returns. If these returns are very close together, relative to the ladar pulse length, in can be difficult to separate these returns. This scenario can be referred to as a "discrete clutter" problem. Hence, a benefit in range resolution is to increase robustness against nearby clutter. Such discrete clutter mitigation can be particularly helpful in ADAS because the road surface is a ubiquitous form of clutter that can contaminate the return from vehicles. Improved pulse duration for optimal balancing can be achieved by first measuring, and updating in real time, the background clutter level.

In an example embodiment, the control circuit 108 can adjust the pulse duration so that a measured SNR of a detected ladar return is maximized for the measured background clutter levels. Furthermore, the control circuit 108 may maintain a plurality of solar thermal mass models for use when adjusting the pulse duration. A thermal emissivity measurement can be used in concert with a reflectivity model to generate a reflectivity map, which can then be used by the ladar system. The reason this is true is that conservation of energy dictates that all the solar dosage across the globe must match the earth's radiation into space, assuming constant global temperature, which is a good approximation for our purposes. Thus emissivity, which is what a passive thermal camera models, can be translated into the ladar system's sensed background clutter levels for evaluation, and this information can be used to adjust the solar thermal mass models of or other background light models in the SNR calculations when adjusting pulse duration.

Figure 3:
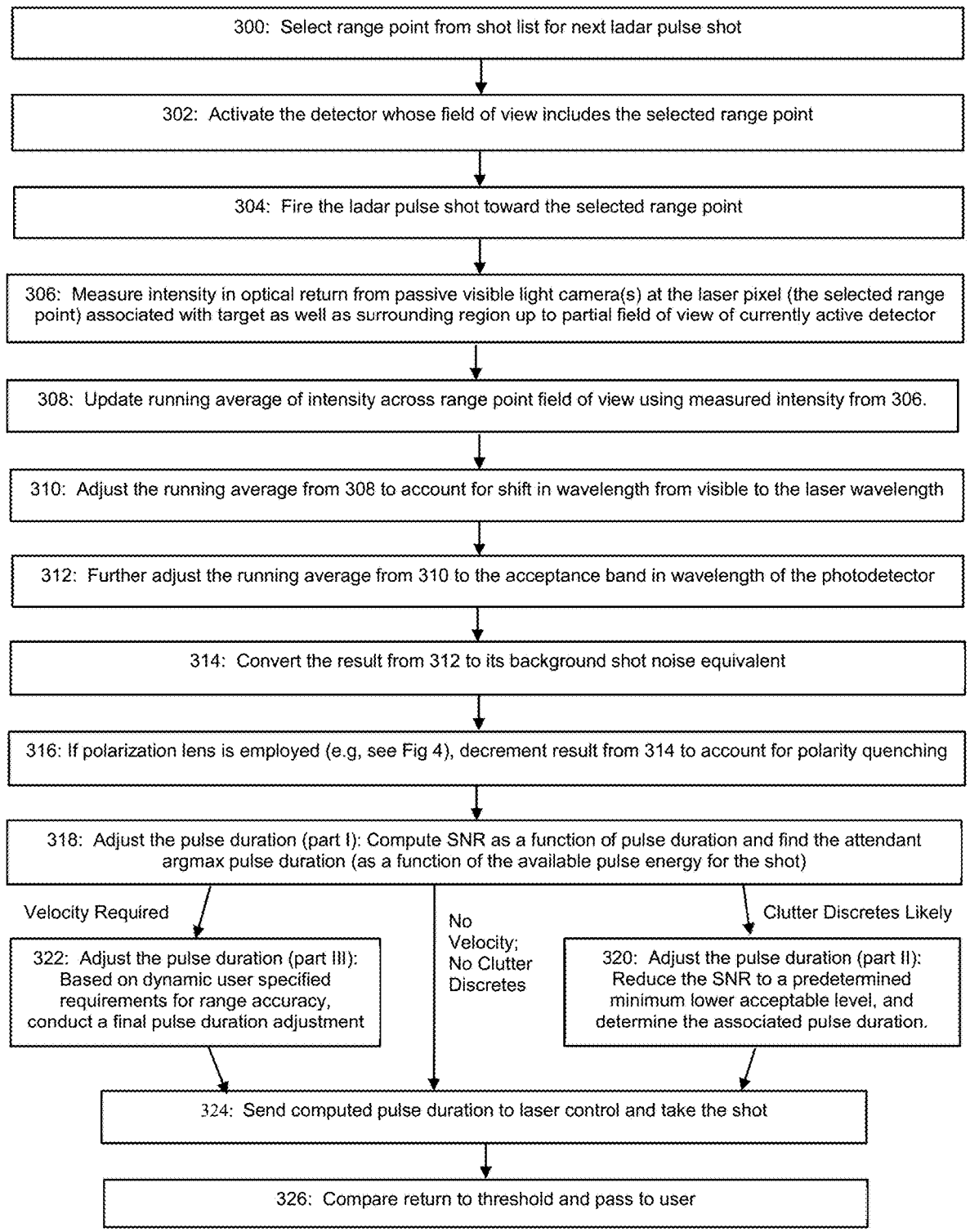
FIG. 3 depicts another example process flow for adapting the pulse duration as a function of measured background light.

FIG. 3 shows a process flow for an example of how pulse variation can be performed in this fashion with respect to the example embodiment of FIG. 2.

Steps 300-304 of FIG. 3 can be performed as set up operations in both day and night scenarios. Also, in the example of FIG. 3, the ladar receiver 104 can be a non-imaging receiver. At step 300, the control circuit 108 selects a range point from a shot list that is to be targeted with a next ladar pulse shot. At step 302, the control circuit 302 can activate the photodetector in the photo-receiver 208 whose field of view includes the selected range point. This step may leverage a multiplexer circuit as described in the above-referenced and incorporated '513 patent. If desired by a practitioner, the activated photodetector may include multiple activated photodetectors in a photodetector array of photo-receiver 208 as described in the above-referenced and incorporated '513 patent. But, if the photo-receiver 208 does not include addressable photodetectors, then it should be understood that step 302 can be omitted. At step 304, the ladar transmitter 102 fires the ladar pulse shot toward the selected range point using scanner 200 and laser 202.

Steps 306-322 can be performed pre-shot to adaptively control the pulse duration for the ladar pulse shot as a function of measured background light.

At step 306, the control circuit 108 measures the intensity in the optical return from the passive visible light cameras 206a/206b at the azimuth and elevation associated with the range point corresponding to each laser pixel (the range point from the current element in the shot list). Note that this passive measurement senses the intensity of background light that the activated detector will sense from the laser pulse return. The ability of a passive measurement to determine background light is predicated on known physics of background solar radiation, and relies on the temporal invariance of such light, so that the camera can collect over a long dwell time and "learn" what background light will manifest itself on the activated detector if and when such detector 208 is used. As part of step 306, the system can analyze the full waveform sensed by the photo-receiver 208 and as digitized by an ADC. The digitized waveform can be fed into a processor (e.g., silicon on a chip (Sic), such as an FPGA). The ladar receiver 104 may include an embedded amplifier and low pass filter to facilitate these operations. The Sic analyzes the distribution of background light energy as a function of incidence angle onto the clutter ground plane, and then computes, for each shot list range point, the anticipated range point background light clutter level. This process can be done either (i) in advance of each range point on the shot list, or (ii) when that range point gets to the top of the list and is selected at step 300. A practitioner may optionally employ logic in the ladar system to determine which path is chosen based on the scenario at hand. For example, if the range point is near the horizon, and the vehicle path for the ladar system is unobstructed to the horizon approach (i) identified above is sensible and warranted, since it allows a long camera collection time and therefore the highest fidelity in capturing background light levels that will interfere with the return pulse from the laser. At the other extreme, if the subject vehicle is poised to enter a tunnel, then approach (ii) identified above is warranted until said vehicle egresses the tunnel and the horizon is once again available. Approach (ii) can also be warranted in a city or urban environment generally, where the background light level for every point in the shot list is likely to vary quickly from street to street as the user's car navigates about the city landscape. If there are multiple ladar receiver 104 staring at different angles, this step can be helpful to account for solar anisotropy as apportioned against the non-imaging photodetector array.

FIG. 2 also shows that the control circuit 108 can be in communication with laser 202. Such a communication link allows the control circuit 108 to send commands to the laser 202 after the desired pulse duration has been determined.

Cameras 206a/206b can be used to not only align color to the ladar pulses to help facilitate compressive sensing, but can also be used to assist in the pulse duration adjustment via links 116a and 116b. This can be accomplished via intensity measurement in RGB channels when looking skyward from a color camera, or by directly measuring earth emissivity with passive infrared imaging. Mass models can then be used to translate emissivity to reflectivity.

Also, one can emulate (to an imperfect degree) a passive thermal camera using a history of data collected by the ladar system itself. This can be done by aggregating shot returns as follows:

Example Process Flow for Determining Background Light Levels Using an Aggregated History of Ladar Return Data (as an Alternative to Cameras):

1) For each range point in the upcoming shot list, inspect the history of previous shots that are still "relevant", e.g. those that are believed to still reliably correspond to and represent the environmental scene viewed by the ladar system.
2) For each such historical shot, use the intensity of the object detected to calculate how much light the earth is radiating at that location. An example embodiment could employ the well-known standard weighted sum estimate, with the weighting being based on the elapsed time. So if $\rho(t)$ expresses the radiation estimate at time t, the estimated net radiation estimate is given by $$\rho(t) \propto \int_{-\infty}^{t} \exp(-\alpha(t-\tau))\rho(\tau)d\tau$$

3) From the corpus assembled in 2), remove any objects that are deemed fleeting (such as cars and pedestrians), since they will be presumed to be transient and not indicative of the situation once the upcoming shot is fired.
4) From the remaining data set, aggregate all the historical returns to obtain an intensity map of the environmental scene. This can be done using the same integral as in 2), repeated for each volume cell (voxel) in the environment.
5) Treat 4) as if it were an image from a thermal camera; and proceed to use the data from this "virtual"/emulated camera to estimate the background light that will be interfering with the return pulse once to upcoming shot in the shot list is fired. This technique, of collecting data from one sensor modality that is instantaneous, and averaging over time to emulate another sensor modality can be referred to as cross domain validation.

Note that the steps 1) to 5) recognize that the background light that interferes with the ladar returns is itself dependent on all the intensities of the objects in the environment. If there is a lot of asphalt (which has little reflectivity), the ladar receiver will not detect much return, and there will not be much background light. In contrast if the ladar pulses are reflecting off a white building, that same building will contribute a lot to the background light leaking into the target return from sunlight reflecting off this building. Thus, sunlight reflecting from all objects around the targets being interrogated by the current range point shot comprise, in the aggregate, the background interference light. Thus, the history of ladar returns bears the imprint of the very background light that is "noise" during collection of ladar returns.

At step 308, the control circuit 108 applies the measured intensity in the optical return from step 206 to a running average of intensity across the range point field of view. This operation yields an updated running average of intensity across the range point field of view.

At step 310, the control circuit 108 further adjusts the updated running average from step 308 to account for the shift in wavelength from visible light to the laser wavelength. An example for step 310 would be as follows. Suppose the camera measures a red object with an intensity of 10 Watts per square meter. We now want to know how much background light this translates to at our subject laser wavelength. This can be done as follows, assuming that the camera 206a/206b collects all the energy in the 620-720 nm band on the red color channel. To simplify the computations, we treat the energy of background sunlight as constant across the color bands in the camera.

Example Process Flow for Translating from Visible Light to Laser Light when Computing Background Light Levels:

1) Convert the color scale of the camera from digital color scale to Watts per meter squared using known features of the camera. This can be performed by taking a known commercially available light source, and using wavelength emission calibration tables available from the US National Institute of Standards and Technology archives, which has been established for purposes of calibrating color and grey scales across cameras for purposes of scientific measurements associated with agriculture, geology, animal science and related endeavors. For the purpose of illustration, we will assume the answer is 60 W/meter-squared.

2) Look up the solar radiation in the visible red band for the given altitude and atmospheric conditions during the camera collection. As an example a dry clear day at sea level would yield about 120 W/square-meter.

3) Calculate the ratio of 1) to 2), which will be 50% in our example. This is the reflectivity of the object.

4) Calculate the radiance from the sun at the laser wavelength and bandwidth. For example, again at sea level (using standard publicly available spectral irradiation tables from NIST), for a dry, clear day, and a 900 nm, 50 nm bandwidth laser and receiver, respectively, we get about 55 W/square meter.

5) Multiply 4) by the result in 3), which in our running example results in 27.5 W/square-meter. In the more general case, this result is a function of wavelength as well, and it can be expressed in W/square-meter/nm, the latter term used to indicate variation in wavelength.

At this point we have accounted for the translation from camera background light to ladar wavelength background light. It remains to account for the effect of the photo receiver 208 on the background light, specifically in the wavelength dependence of this receiver. This is accomplished in step 312. At step 312, the control circuit 108 further adjusts the adjusted running average from step 310 to the acceptance band in wavelength of the photo-receiver 208. This can be accomplished by taking the result in step 5) above, at each wavelength (measured in nanometers (nm)) and multiplying by the response of that wavelength in the photo receiver 208, and then summing across nm, to obtain a quantity expressed in W/square-meter.

At step 314, the control circuit 108 converts the adjusted running average from step 312 into its background shot noise equivalent. This step is performed because, for ladar detection it is not the light energy (in the classical physics regime) from background light per se that is the cause of interference, but rather the quantum fluctuation of said light. If background sunlight was exactly constant, then the background light (which is the composite of all sunlight reflected from everything in the environment) would be exactly constant for a given environment. In that case, we would simply subtract off this constant (which would then be essentially a DC bias) and eliminate the noise. But, in reality there is fluctuation; and that fluctuation is what we call background shot noise. This quantity can be computed from the classical energy by using the fact that the quantum fluctuation has a variation equal to the classical energy value.

Thus far, we have not accounted for polarization. Background light has polarization structure generally. If polarization lenses are used in the ladar receiver 104, then it is desirable to accurately account for the reduction, or quenching, of background light on each polarized receiver. At step 316, the control circuit 108 can thus decrement the result from step 314 to account for polarity quenching if the ladar receiver 104 employs a polarization lens. For example, as derived from infrared detection textbooks, the polarity quenching from a pure Lambertian target will be 3 dB or 50%.

At step 318, the control circuit 108 computes the theoretical signal-to-noise ratio (SNR) for the upcoming range point shot to be detected as a laser return pulse, including all five interference terms. Note, at this point this pulse is a conceptual entity, the shot has not yet been taken. As a result, we can employ a mathematical expression which is a function of the pulse duration D of the pulse which has yet to be formed (see Dereniak, E. L., Boreman, G. D., "Infrared Detectors and Systems", 1st Edition, Wiley, 1996; the entire disclosure of which is incorporated herein by reference). We denote $E_{pp}$ as the energy per pulse, p(t) as the pulse received, k is Boltzman's constant, $\Omega$ is the effective trans impedance resistance, $\Delta f$ is the bandwidth of the receiver and the pulse, B is the optical bandwidth, and P is the average Planck spectral density across the optical bandwidth, and A is the effective pupil diameter, where h, c, $\lambda_c$, $\mu$, q, $i_{dark}$, clutter, Self$_{shot}$ are respectively Planck's constant, the speed of light, the optical carrier, the computed net background light effective reflectivity, an electron's universal invariant charge, the dark current, the clutter background, target shot noise, and L is the aggregated loss factors:

$$SNR(\Delta f) = \frac{E_{pp}L\pi A^2 \max(p(t))}{\sqrt[4]{\frac{4kT}{\Omega(\Delta f)}\Delta f^{-1} + \frac{\pi A^2 \lambda_c}{4hc}q^2\mu P\Delta f^{-1} + \text{Self}_{shot} + i_{dark} + \text{clutter}}}.$$

In a simplified example embodiment, which is probably sufficient in most cases, the last three terms in the denominator can ignored. The control circuit 108 can then find the pulse duration (as a function of the available pulse energy for the shot) that maximizes the SNR. Such a process (finding a quantity that maximizes another quantity) is referred to as an argmax operation.

At step 320, the control circuit 108 adjusts the computed SNR, reducing the duration (as needed) to account for the possibility of clutter discretes. The effect of such terms is accounted for directly in the denominator term "clutter" in the immediately above clutter formula taken from Boreman. For instance, if the range point is grazing the road surface, it is desirable to reduce the pulse duration so that the system avoids comingling road clutter with the return pulse from a car. In contrast, a range point fired above the horizon does not need to have a shortened pulse because no clutter discretes are anticipated since no nearby clutter is deemed likely to occur in the sky.

SNR is linearly proportional to range resolution. Thus, if we double the SNR, then range measurement uncertainty drops by 50%. This allows us to adjust SNR to obtain a desired range accuracy. For example, if our intent is to extract velocity from a moving vehicle, we require high range measurement, so that we can determine motion from small range offsets frame to frame. At step 322, the control circuit 108 further adjusts the computed SNR based on desired range measurement accuracy. This can be done in a manner similar to that in step 314. Specifically, we can pretend ahead of time that the upcoming range point shot has been taken, and then find the resulting range resolution as a function of this shot's pulse duration. We then find the pulse duration (again using argmax procedures) to achieve our predetermined, desired, range resolution.

The example of FIG. 3 shows steps 322 and 320 as optional and mutually exclusive. This is because we will not choose to determine velocity from range points where clutter discretes are likely, and we will not need to make any pulse duration adjustments when neither clutter discretes are anticipated nor velocity extraction needed.

At this point, step 324, the desired pulse duration has been determined and is available. Now the system can use communication link 118 to pass the defined pulse duration from control circuit 108 to the laser 102 (and the laser can then be instructed to take the shot).

Steps 306-322 as described above can be performed as pre-shot operations during daytime use of the system. For nighttime use, a practitioner may choose to perform steps 318-322 with corrections as needed for any estimated thermal sky noise, measured earth emissivity, or headlights (or other unnatural lighting conditions) if these are deemed to exceed the thermal and dark current noise.

Thereafter, at step 326, the control circuit 108 compares the pulse return to a threshold, and, if this threshold is exceeded, the pulse position (range) location and intensity can then be passed to a user (which may take the form of a consuming application) via link 250. The information passed to the user can include fused RGB shot returns, (added range, azimuth, elevation, and intensity). Furthermore, this information can include, as desired, radiometry and metrology associated with background light. If thermal and dark current is below the background shot noise, it should be noted that the pulse duration SNR/resolution trade has no dependency on the latter terms. Accordingly, this can make it beneficial to build the ladar receiver 104 using photodetectors with built-in gain, such as APDs.

In another example embodiment, the control circuit 108 can be configured to provide control instructions to the ladar receiver 104 that are effective to provide a frequency domain "shuttering effect" on the photo-receiver 208 of ladar receiver 104 thereby effectively admitting light across a reduced bandwidth into the photo-receiver detection chain. Since a longer pulse has a lower bandwidth, this process reduces the background light interfering with the target return by removing the incoming background light not required to capture the target return. This shuttering can be adjusted as a function of the measured background light. By employing such shuttering, the system 100 can achieve an effect similar to adaptively modifying the optical circuit in the photodetector (feedback resistance change) to account for changes in pulse duration. This shuttering effect is useful to increase pulse energy when the peak power limit has been met and higher SNR is required. Since the feedback resistance is not changed, shuttering is less effective than true optical photodiode circuit tuning, but it is far easier to implement since it can be accomplished in software. An example shuttering process can be summarized as follows:

Example Process Flow for Shuttering to Adaptively Reduce Bandwidth:
1) Using the process in FIG. 3, determine the desired pulse duration.
2) Compute the bandwidth needed for the shuttering process by taking the Fourier Integral of the pulse and identifying those frequencies which contain negligible pulse intensity.
3) Digitize the data gathered from the analog front end in the photo receiver using an ADC.
4) Based on 2), construct a digital filter that will remove these frequencies, prior to taking the shot, and apply this matched filter digitally, prior to application of detection threshold logic.

Notice that we can consider this process as a virtual shutter because we are essentially emulating in software the effect shuttering would have had if we had truly done it in the actual photo receiver front end.

Figure 11:
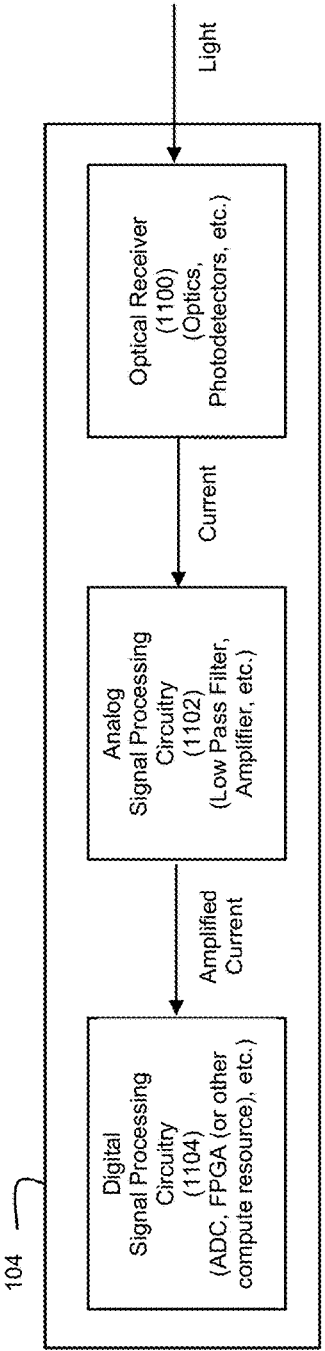
FIG. 11 shows an example ladar receiver where shuttering can be employed to adaptively reduce bandwidth.

FIG. 11 shows an example ladar receiver 104 where shuttering can be employed to adaptively reduce bandwidth. The ladar receiver 104 can include an optical receiver 1100 front end. The optical receiver 1100 can include optics and photodetectors that cooperate to convert incoming light into current, as discussed above and the incorporated patents and patent applications. The current is fed into analog signal processing circuit 1102, which may include low pass filtering circuitry and amplifier circuitry. For example, the analog signal processing circuitry may include transimpedance amplifiers (TIAs) and feedback resistance as discussed in the incorporated patents and patent applications. The amplified current is then fed into digital signal processing circuitry 1104 which includes an ADC that digitized the amplified current signal and an FPGA or other compute resource where operations such as matched filtering can occur. Such an FPGA (or other compute resource) can also implement the frequency domain shuttering discussed above.

II. Polarization Diversity on Receive

The ladar system may also be designed in any of a number of ways so that polarization properties can be advantageously leveraged with a ladar receiver capable of discriminating polarity. There can be 4 basic options in this regard:
1) Camera has polarization but ladar receiver does not: Augment the point cloud
   An example of an embodiment for this situation is discussed below with reference to FIGS. 9A-9C. This case allows the ladar system to generate a substantial number of "virtual range points" without firing any ladar shots.
2) Camera has polarization but ladar receiver does not: Quickly find and mitigate retroreflectors.
   The camera can be used to find likely retroreflective sources. This reduces computational cost and lowers latency and false alarms. This case is examined in FIG. 4 if the figure is (conceptually) modified so that receiver 402 is removed and receiver 404 is modified so as to detect any polarization (but with no polarization discrimination whatsoever). This approach relies on the fact that the camera will likely have polarization structure on pixels where the ladar return does; but the polarization receiver, due to a lack of polarization sensitivity does not evince this effect. The value to the practitioner is that polarization diversity in cameras is a low cost modification, simply using micro lenses, such as is available from Sony, whereas for a ladar system an entire separate ladar receiver chain would be mandated. The associated data analysis for using a camera with polarization sensitivity to detect retroreflectors is detailed in Process Flow A below.
3) Camera has no polarization but ladar receiver does:
   This approach is outlined in Process Flow C discussed below. A simple example would be a search for red objects which are almost certainly retro-reflective by design (for safety). This cueing then enables the agile ladar system to "anchor" on range points where target return energy will be very high, and will further benefit from a polarization processing gain.
4) Ladar-only polarization enhanced segmentation (fingerprinting) and retro-rejection
   This case is examined in detail in Process Flow B discussed below and FIG. 5.

Figure 4:
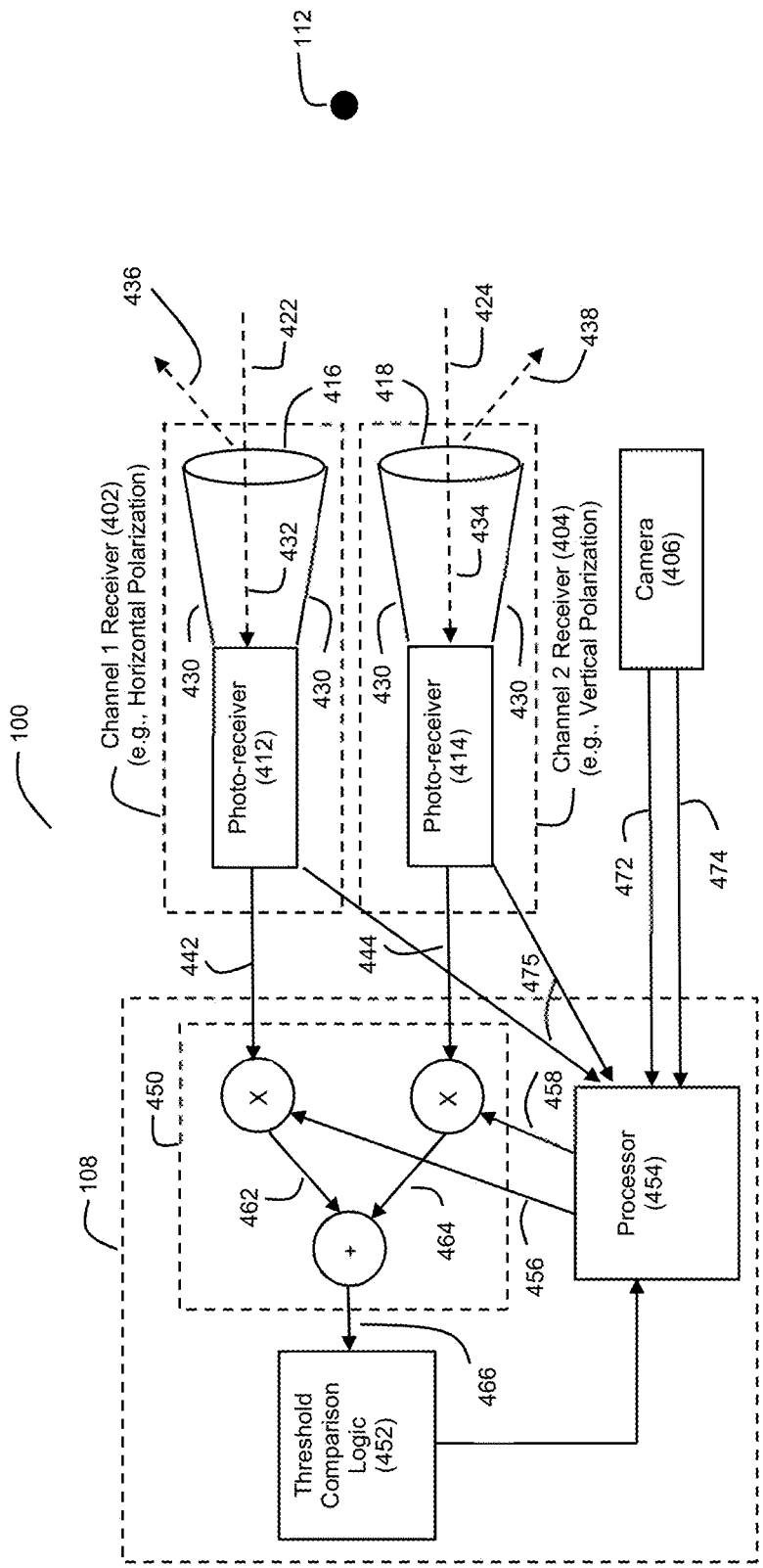
FIG. 4 depicts an example ladar system that employs polarization diversity in receive channels to separate retroreflective from non-retroreflective returns.

Pre-Digital Ladar Polarization Architecture:
FIG. 4 depicts an example ladar system 100 that employs polarization diversity in ladar receiver channels to mitigate adverse events such as retroreflector sidelobe leakage. As such FIG. 4 and this section address cases 3),4) above. The processor 454, whether it be an FPGA or some other type of compute resource, takes the digitized data from the camera 406 and/or the ladar receiver using data paths 475, 472, 474 and uses it to determine whether a retroreflector is present.

The details of the processing in an example embodiment are described below, with labels referring to FIG. 4 and prior figures as appropriate and evident in context.

The system 100 may include multiple receive channels (e.g., channels 402 and 404). Channel 402 can correspond to a first polarization (e.g., horizontal (H) polarization), and channel 404 can correspond to a second polarization (e.g., vertical (V) polarization). Channel 402 can include photo-receiver 412, and channel 404 can include photo-receiver 414. Accordingly, FIG. 4 includes, for each sub-field of view (for multiple non-imaging cells) or the entire field of view (for a single imager embodiment), two photo-receivers 412 and 414. Photo-receiver 412 can produce a H-specific polarized return signal output 442, and photo-receiver 414 can produce a V-specific polarized return signal output 444.

FIG. 4 does not show the ladar transmitter 102 for ease of illustration, but it should be understood that system 100 of FIG. 4 may also include a ladar transmitter 102 as discussed above. Also, as an example, FIG. 4 does not include, for ease of illustration, a near range coaxial receiver (which as discussed above can be useful for removing near range blind zones). However, it should be understood that the system 100 may include such a near range coaxial receiver if desired by a practitioner.

The photo-receivers 412 and 414 can be each attached optically to a compound parabolic concentrator (CPC) whose boundaries are shown in FIG. 4 as 430. At the entrance of each CPC are lenses or coatings 416 and 418 which are respectively H and V polarized filters (where the H polarized filter accepts H light and rejects V light, and where the V polarized filter accept V light and rejects H light). Thus, in an example embodiment, channel 402 can include a lens 416 that serves as a polarizing lens for the H polarity of channel 402. Channel 404 can include a lens 418 that serves as a polarizing lens for the V polarity of channel 404.

To begin, the return from range point target 112 can arrive at lenses 416 and 418 via optical paths 422 and 424. The lenses 416 and 418 are not drawn to scale for visual simplicity. Furthermore, FIG. 4 does not show the range point 112 with distance to scale. At proper standoff scale, the rays indicated by optical paths 422 and 424 would be nearly collinear due to the far field effect. The V component of light in 422 (see 436) would be rejected by the H-polarized lens 416, while the H component of light in 422 (see 432) would be passed on to the photo-receiver 412. The H component of light in 424 (see 438) would be rejected by the V-polarized lens 418, while the V component of light in 424 (see 434) would be passed on to the photo-receiver 414.

In addition, passive light from the range point target 112 can be collected after free space propagation onto the camera 406. The camera 206 can be equipped with polarization sensitive imaging sensors, and the camera 406 can produce H pixels 472 and V pixels 474 that get sent to the processor 454 of control circuit 108. Processor 454 may take the form of any suitable processor for performing the operations described herein (e.g., the processor 454 can be a SiC device such as an FPGA). Only one camera 406 is shown in FIG. 4 for ease of illustration, but it should be understood that multiple cameras could be employed (e.g., see FIG. 2) if desired by a practitioner.

Post-Digital Ladar Polarization Architecture:

To recap, channels 402 and 404 and camera 406 can produce four data streams: H and V polarization from the target return (see 442 and 444), each of which has an intensity measurement, and azimuth elevation and range measurement, as well as camera-derived color intensity, RGB, also in polarization space, via the H pixels 472 and the V pixels 474. These data streams provide a rich data set of camera and ladar registered pairs.

The ladar data dimension count via 442 and 444 is invariant per polarization, remaining at 4 for H and 4 for V, for a net of 8 (where the data dimensions include (1) range from the H ladar return, (2) intensity from the H ladar return, (3) cross range (azimuth) from the H ladar return, (4) height (elevation) from the H ladar return, (5) range from the V ladar return, (6) intensity from the V ladar return, (7) cross range (azimuth) from the V ladar return, and (8) height (elevation) from the V ladar return. It should be noted that that the range and intensity may vary, and if interpolation is used the measured arrival angle may vary as well. As described in U.S. Pat. App. Pub. 2019/0086514 (the entire disclosure of which is incorporated herein by reference), there are two kinds of azimuth (Az) and elevation (El) quantities, those of the transmitter 102, determined by each entry in the range point shot list, and those of the receiver 104. The receiver Az and El are identical to the transmit Az and El unless we interpolate. For example, if we find there is in a frame, at a given range, two returns spaced 0.1 degrees apart, at 0 degree and 0.1 degrees in azimuth each with measured intensity 5, i.e. we obtain {5,5}. In this situation, we may safely surmise the actual target is situated at 0.15 degrees. However, if we found three returns at 0, 0.1, 0.2 degrees with intensity values {2,8,2}, we could safely surmise that the correct angle in azimuth for the receiver is 0.1 degrees. Note that we are using symmetry here, as we did in range interpolation discussed earlier, which is legitimate since the spatial point spread function of a laser pulse is circularly symmetric.

The camera channel can have multiple dimensions as well, since two angles are needed in 3D space to define polarization. In other words, H and V separation gives you two angles for each x, y data point. This implies that some practitioners might desire more than two channels in FIG. 4 for the ladar receiver, since the H-V channels 402 and 404 do not evince the entire polarity. However, since targets are usually in a known ground plane, if archived terrain data is available, the third polarization channel may be largely redundant. Accordingly, it can be left to the discretion of a practitioner whether additional channels are desired for the ladar receiver.

With the example of FIG. 4, the data dimensionality per pixel is now 3 (RGB) plus 2 (for polarization orientation), assuming that the RGB channel is used the extract light intensity. The example of FIG. 4 can thus have a net channel count (i.e., net data dimension), per shot of 13. Furthermore, it should be understood that a polarization camera, if used as camera 406, may present data formats with more dimension. For example, the Sony Megapixel full color polarization camera presents the polarization vector as a four quadrant measurement.

Furthermore, while the example of FIG. 4 is discussed above and below in the context of using polarization passive imaging for retroreflector removal, the inventors believe that this technology can also be useful for other purposes. For example, the inventors believe that the example of FIG. 4 can be useful for finding the sun's position on cloudy days. As another example, the inventors believe that the example of FIG. 4 can be useful for differential passive range estimation on gradient surfaces. As yet another example, the inventors believe that the example of FIG. 4 can be useful for enhanced vehicle-to-clutter contrast ratio using the specular nature of windows and license plates. As still another example, the inventors believe the example of FIG. 4 can use a polarization camera pointed skyward in conjunction with a sun tracker (either software plus GPS or direct gaze) to refine a Rayleigh scattering model (e.g., Rayleigh solar model), which can assist in overall modeling of atmospheric attenuation models.

To recap, the channels in FIG. 4 available for detection are as follows:
Camera channel: RGB intensity, plus polarization azimuth and elevation=5 channels
Ladar channel: H intensity and range, V intensity and range, and azimuth and elevation for each polarity=8 channels.

As noted, this yields a net of 13 channels for the overall system 100.

Figure 5:
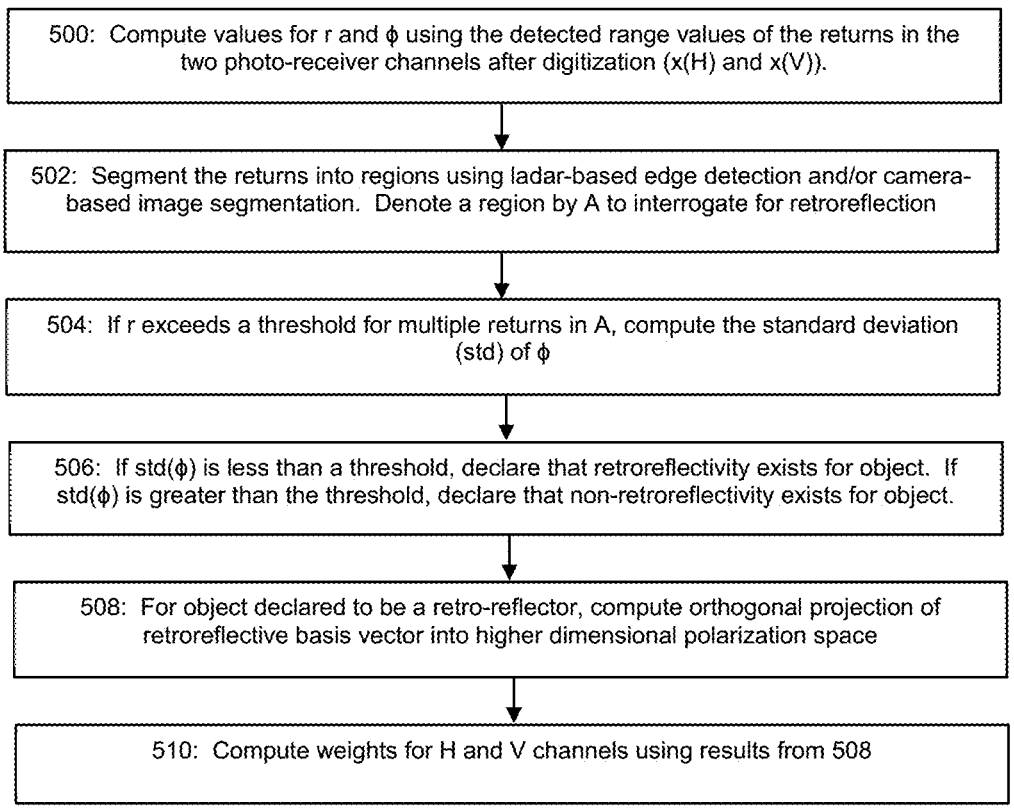
FIG. 5 depicts an example process flow for using polarization diversity on receive to separate retroreflective from non-retroreflective returns.

The control circuit 108 of FIG. 4 can be configured to process the ladar return polarization signals 442 and 444 and the camera polarization data 472 and 474 to determine whether a retroreflector is present in a ladar frame. This system can detect retroreflectors in this fashion on a frame-by-frame basis. FIG. 5, discussed in greater detail below, describes an example process flow for operations that can be performed in this regard.

To support these operations, control circuit 108 can include an ADC (not shown) that digitizes the ladar return polarization signals 442 and 444. The control circuit 108 can also include channel mixing logic 450 that computes a weighted sum 466 of the digitized H ladar return polarization signal and the digitized V ladar return polarization signal. The weighted sum 466 can be compared to a threshold by threshold comparison logic 452 to determine whether a retroreflector is present in the frame. The threshold can be determined based on how stable the laser polarization is, and how accurately the retroreflector preserves polarization, accounting for any atmospheric artifacts. This may be achieved using numerical modeling, or simply historical behavior from actual known retroreflectors. Processor 454 can then process the result of this threshold comparison which indicates whether the retroreflector is present. If the predetermined threshold is exceeded, then target presence is declared. If the predetermined threshold is not exceeded, then no target is declared in the shot return. In the latter case, no output is passed through communication link 250.

FIG. 5 shows an example of how the system 100 of FIG. 4 can use polarization diversity to mitigate retroreflectors. As noted above, the system 100 can be used for other purposes as well if desired by a practitioner. With the FIG. 5 process flow, the control circuit 108 digitizes the signals 442 and 444 and uses a processor such as Sic to process the digitized data from the photo-receivers 412/414 and camera 406. The process flow of FIG. 5 can use visible band polarity coherency to assess retroreflective (non-Lambertian) returns, which, when associated with high intensity (in turn) indicates retro reflectivity is likely in the ladar return.

In a related development, the inventors note that polarization measurements can be used to precisely pinpoint (in daytime, of course) the sun's position—even in dark, cloudy conditions or fog conditions. See Hegedus, R. et al., "Could Vikings have navigated under foggy and cloudy conditions by skylight polarization? On the atmospheric optical prerequisites of polarimetric Viking navigation under foggy and cloudy skies", Proceedings of the Royal Society A, Volume 463, Issue 2080, Jan. 16, 2007, the entire disclosure of which is incorporated herein by reference. Today we have many other techniques for finding where the sun is positioned relative to ourselves, (e.g., a GPS unit), and access to the internet where many web sites (e.g. Google Earth and Heavens-Above) indicate relative solar movement relative to latitude and longitude.

Figure 9A:
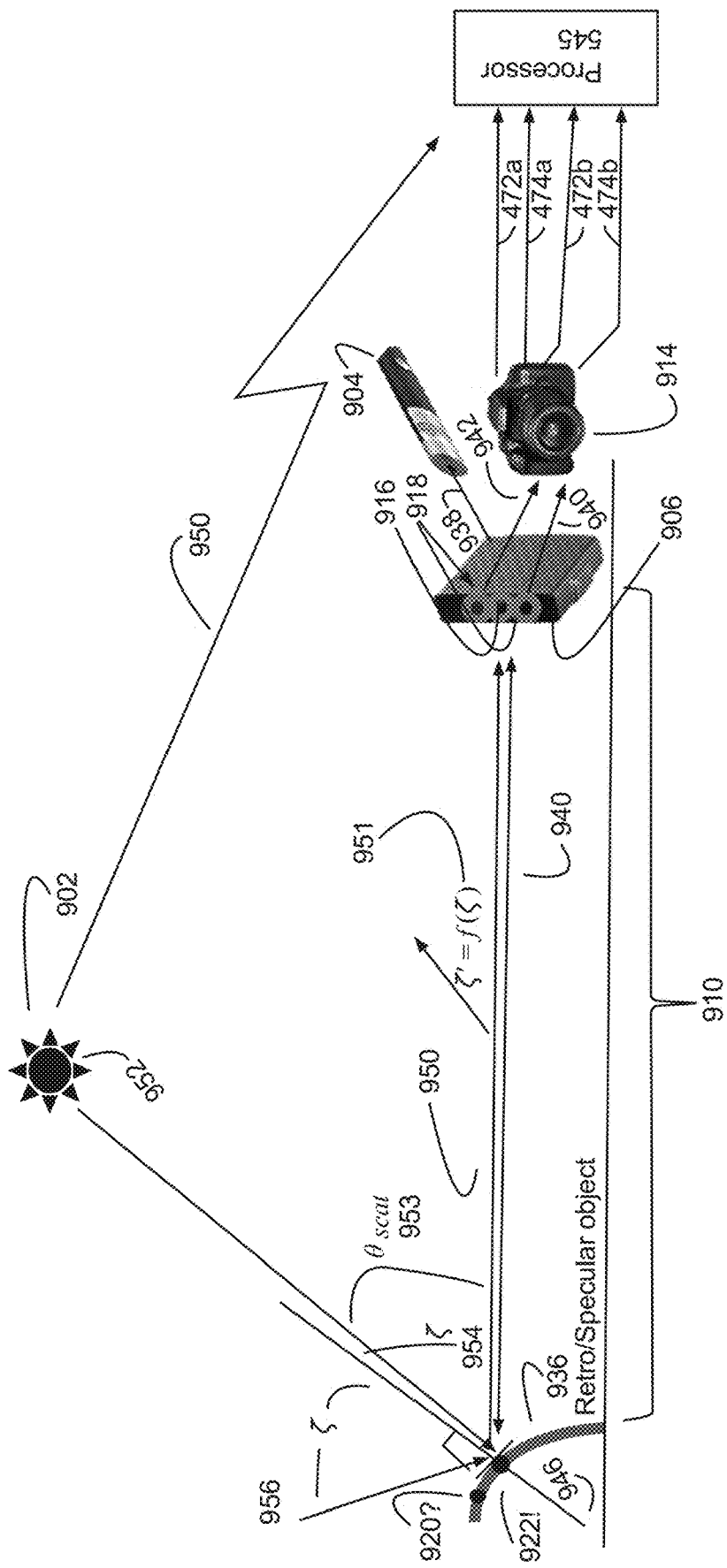
FIG. 9A shows an example embodiment for a ladar system that uses passive polarization for point cloud augmentation.

Details of a method of finding polarization angle anticipated from a given angle is found in FIG. 9A. The sun is positioned at location 902. We assume that the knowledge of where the sun is positioned is known to the processor 454, which is where the point cloud augmentation fusion and computation occurs. We indicate this knowledge by the "lightning bolt" symbol 950. The knowledge may arise from direct sun tracking or simply internet search combined with GPS for "own vehicle" knowledge. In any polarization camera 916 observing a point in the sky we predict the polarization to be as follows, in steps 1-3, enabling us to relate sky polarization to sun position.
1. Denote the plane containing the sky point, the camera 916, and the sun 902 as the scattering plane. Next compute the normal to this plane
2. Compute the tangent to the Meridian of the object at a chosen pixel.
3. The predicted polarization angle will be the angle between these two vectors.

In terms of a process flow, the operation of the system of FIG. 4 can be described as follows:

Example Process Flow a for Down Selecting which Range Points to Interrogate in the Ladar Point Cloud Based on Analysis of the Passive Polarization Camera
1) Inspect the camera polarization data by finding pixel clusters where polarization is not changing.
2) Mark the associated Az, El in the shot list as shots likely to exhibit retro reflections in the return signal
3) Contrast the polarization of the camera return with that predicted by a retro reflective model. If it is different, we have a polarization altering material, e.g. a retro reflector (refer to steps 1-3 in preceding paragraph for Rayleigh model details). An example of material used in road signs and other retroreflective objects, where documented polarity vs sun angle are known, is 3M™ Advanced Polarizing Film.

The benefit of the above three stage process is that it reduces the processing burden by limiting retroreflective detection and mitigation to only those shots where it is needed.

At step 500 of FIG. 5, the processor computes values for r and ϕ using the detected range values of the polarized returns 442 and 444 from channels 402 and 404 after digitization (where these returns can be labeled x(H) and x(V)). The variables r and ϕ are the polarization return data from x(H) and x(V) expressed in both overall intensity, r, and angle, ϕ. In polar coordinates, these can be computed as:

$$r = \sqrt{x(H)^2 + x(V)^2}, \phi = a\tan\left(\frac{x(V)}{x(H)}\right).$$

The benefit of using polar coordinates is that the retroreflective analysis in FIG. 5 is based on how well the polarization angle is preserved, the net return intensity, r, while useful in other instances, such as interpolation, is meaningless at this stage in the processing.

At step 502, the processor segments the returns x(H),x(V) into regions using ladar-based edge detection and/or camera-based image segmentation. A region that is to be interrogated for retro reflection can be denoted by the label A. This segmentation can employ machine-learning techniques, such as mixture model decomposition. As an example, the segmentation can use k-mean clustering whereby the segmentation is performed by clustering x(H),x(V) spatially into contiguous voxels (blobs), each denoted by A, where in each blob the polarization angle φ is constant.

At step 504, the processor checks whether r exceeds a threshold for multiple returns in a given blob A. If so, the processor computes the standard deviation (std) of φ. This process can also employ machine-learning techniques, such as an analysis of variance process. For example, the analysis of variance process can be useful for texture analysis in an image. Smooth surfaces, like painted dry wall, tend to have RGB values that are very stable (low std) whereas rougher surfaces such as wood, carpets, and plants tend to have fluctuating, unstable RGB values (high std). To use an example, suppose the returns {1,2,3,4,5,6} have polarization angles, in degrees, of {12,13,17,1,1.2,1} respectively. Then, the machine learning logic would identify two blobs, A(1), A(2) as follows:

A(1)=returns {1,2,3} with mean angle 14 and standard deviation 2.6; and

A(2)=returns {4,5,6} with mean 1 and std 0.1.

At step 506, the processor checks whether the std(φ) computed at step 504 is less than a threshold. If the std(φ) is less than the threshold, the processor declares that retro reflectivity exists for the subject object. If the std(φ) is greater than the threshold, the processor declares that non-retro reflectivity exists for the subject object. If the threshold was chosen as 0.2, for example, we would declare A(2) to be a retro reflector and A(1) as not a retro reflector (i.e., Lambertian). The threshold can be chosen based on multiple considerations. For example, a first consideration can be that the threshold should be consistent with known polarization std values from Lambertian targets. It is known that such non-retro reflective targets have a polarization std of about 10 degrees. So, it is desirable for the threshold not to be anywhere near that big. Next, a second consideration can be that we will want to use an std that is large enough to capture variation in the camera accuracy (digital quantization will give its own std for example), and finally we will want a threshold that addresses std values for actual observed highway and road signage. The field of polarization imagery is sufficiently nascent that, at present, there is limited empirical data to formulate a good numerical threshold value including this latter consideration, but nonetheless we present methodology forthwith to accomplish the pursuit of such a value, which will generally be in the range of 1 Os of percent.

At step 508, for an object declared at step 506 to be a retroreflector, the processor computes an orthogonal projection of the retroreflective basis vector into higher dimensional polarization space. Basis vector can be expressed (for isomorphism) as the angle φ, and the orthogonal basis is simply $$\frac{\pi}{2} - \phi.$$

Then, at step 510, the processor can compute the weights 456 and 458 be used for the H and V channel outputs respectively based on the results from step 508. For example, let us treat 442, as x(H) and 444, as x(V). Then suppose the system finds that in an analysis of ladar returns in a neighborhood of a range interval, across an Az, El cluster, A(i) has a polarization angle of 36 degrees, with an std of 0.1 degrees. Then, we declare the presence of a retro reflector. It should be noted that the system may also have extracted this information, 36-degree mean, 0.1 degree std, from analysis of camera data or any combination thereof. We then deem that the matched filter weights 456, 458 must suppress this signal. The system can do this by setting the weights 456, 458 to sin(54 degrees) and cos(54 degrees) respectively.

Once the weights are computed by processor 454, using inputs from 472, x(H), and 474, x(V), as well as detected returns from threshold comparison logic 452, these weights (denoted by 456, 458) are communicated to the multiplier logic in processing logic 450 as shown by FIG. 4. The second input, i.e. the second multiplicand, for the multiplier logic is in each respective case is 442, 444 respectively, which are the digitized outputs from the photo-receivers 412, 414. The resulting products from these multiplications, 462, 464, respectively, are then passed along to an adder logic block within 450, as shown by FIG. 4. The result of this adder is then passed to a the threshold comparator 452 via communication path 466. As discussed above, the output from threshold comparison logic then assists processor 454 with determining weights for subsequent shots. This data is passed by the communication link 494 to the processor 454. A smaller subset of the data in 452 can be passed along to the user or other consuming application along communication channel 490.

The discussion thus far assumes that the goal is to suppress the retro returns. This is the case when there is a concern that a retroreflector will bleed into other pixels in the receiver 104. At other times, it may actually be desirable to find retroreflectors. For example, if the ladar system is pointing at the road, a retro reflector is quite likely to be a license plate or a tail light or headlight. These are useful features to exploit to improve on-road sensing. As such, a variant of the procedure discussed above is also desirable. An example embodiment of such a variant is as follows, which assumes a polarization stable ladar source with two polarization receivers:

Example Process Flow B for Object Fingerprinting Based on Polarization (Ladar Polarization Only):

1) Compute the polarization stability frame to frame for each range point at each range. An example embodiment would be to compute the per pixel standard deviation in the reported polarization angle.
2) Build a "polarization point cloud" which shows how the polarization varies for a given x, y position in the aggregated frames.
3) Cluster the polarization point cloud, using k-means, or other suitable machine learning technique, to identify those segments with low variance (high stability) linear polarization. Note that this can be viewed as a form of polarization fingerprinting.
4) Fit these segments to a solid model of a vehicle and use this for further inspection in from the ladar system, after fingerprinting. For example, an example solid model would be three cubes: (i) a short, low, one in front (hood), (ii) a large one in the center (chassis), and (iii) one short, low, one in the rear (trunk). The car windows in the large cube (chassis) would very likely have different polarization from the chassis painted body and would hence comprise a fingerprint, more detailed than just the triple cube model per se.

The above example is for ladar polarization only (with no camera polarization), which is useful at long range, or at night, even when a camera is available. An interesting example for this use case would be with tail lights (which are retro reflectors). A relative range change between and betwixt a set of tail lights would signal that the car is initiating a turn, long before bulk frame-to-frame processing would establish a change in position. One might well detect tail lights at ranges beyond where cameras can see, and so this would be a powerful way to obtain long range tracking.

Figure 6A:
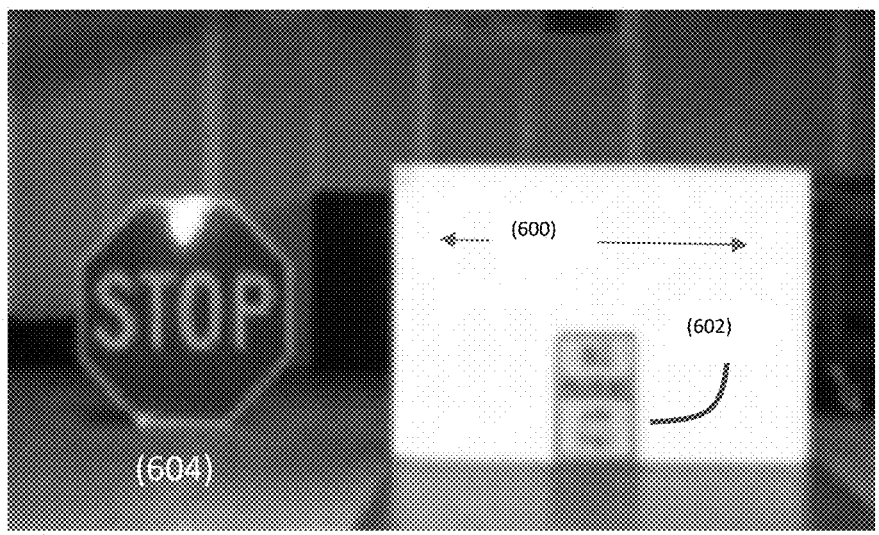
FIGS. 6A-6C depict examples of different ladar images that can be produced by ladar systems with and without the polarization diversity features of FIG. 4.
Figure 6B:
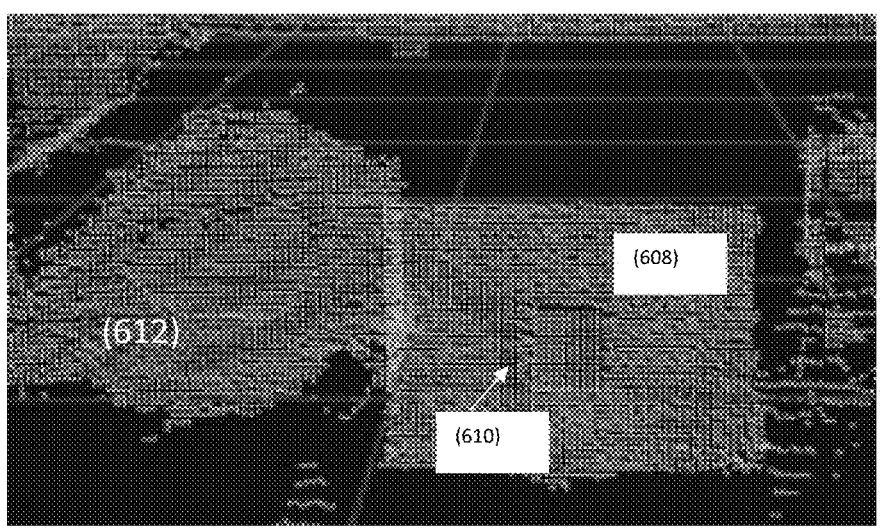
Figure 6C:
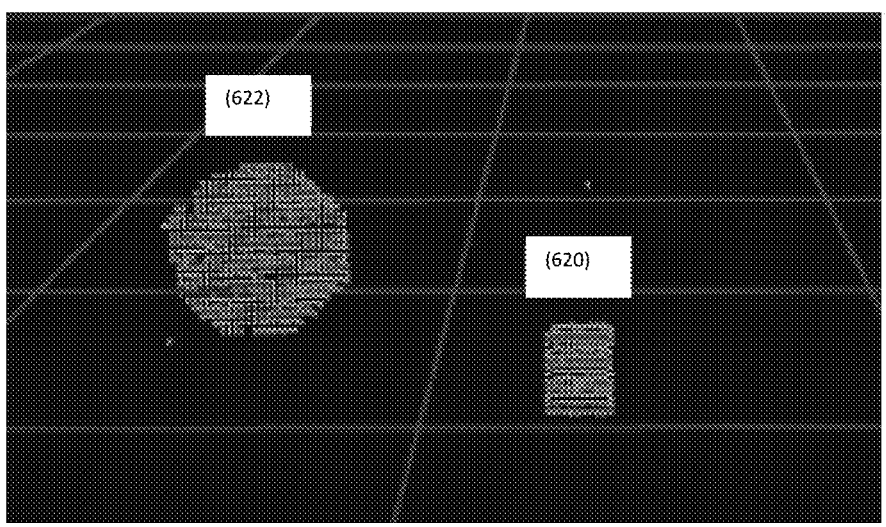

While the example of FIG. 4 shows an example of a ladar system 100 that uses a camera 406, it should be understood that retroreflector sidelobe leakage can be mitigated by a system 100 that includes the dual channel polarizers and control circuit 108 without the need for camera 406. FIGS. 6A-6C show an example of the ability of a polarization channelizer embodiment as shown by FIG. 4 to find retroreflectors directly without the need for a camera 406. In this example, data was collected off of an AEye 90 iDAR device at an indoor ladar range.

FIG. 6A shows a photograph of a scene taken from an iDAR camera. In FIG. 6A, 600 is a Lambertian target (not retroreflective), while 602 and 604 (street signs) are two retroreflectors.

FIG. 6B is the point cloud of the return of the scene as detected by a single channel agile bistatic ladar system, where returns from targets that include the scene of FIG. 6A are passed into the apparatus of FIG. 2, and the output at 250 is plotted. In FIG. 6B, 608 maps to object 200 from FIG. 6A, 610 maps to object 202 from FIG. 6A, and 612 maps to object 604 from FIG. 6A. Sidelobe leakage can be referred to as a "Halo" since it tends to surround the true location of an image. In passive imaging, this effect also can arise and is referred to as blooming. An undesirable "halo" is clearly visible from the for the stop sign 604 (as seen via 612) as well as a lesser halo from the no parking sign 602 (as seen via 610). It can be noted that the parking sign 602 appears "elevated" because of the shiny floor which induces below-the-floor-returns. The halo from the no parking sign 602 is more difficult to see than the halo from stop sign 604 because of the white panel 600 that is behind it; but close inspection of the return near 610, especially the left part, shows a striped structure, evincing sidelobe leakage from corner cubes in the signage.

FIG. 6C shows the result of using the dual channel agile bistatic receiver of FIG. 4, whereby 620 and 622 in FIG. 6A clearly reveal the retroreflective returns only. The weights 456 and 458 here had been chosen to maximize polarization contrast ratio, i.e. polarization ellipticity, using least squares adaptive beamforming concepts as discussed for example in "Adaptive Radar Detection and Estimation", by Allan Steinhardt and Simon Haykin, 1992, Wiley and Optimum Array Processing: Part IV of Detection, Estimation, and Modulation Theory, Wiley, Harry L. Van Trees, 22 Mar. 2002, the entire disclosure of which is incorporated herein by reference. We can do this, for example, as follows. If we denote the polarization vector on transmit as v and the H,V polarization covariance as R, then the 2D weight vector w is simply:

$$w = \frac{R^{-1}v}{v^T R^{-1} v}.$$

Figure 8:
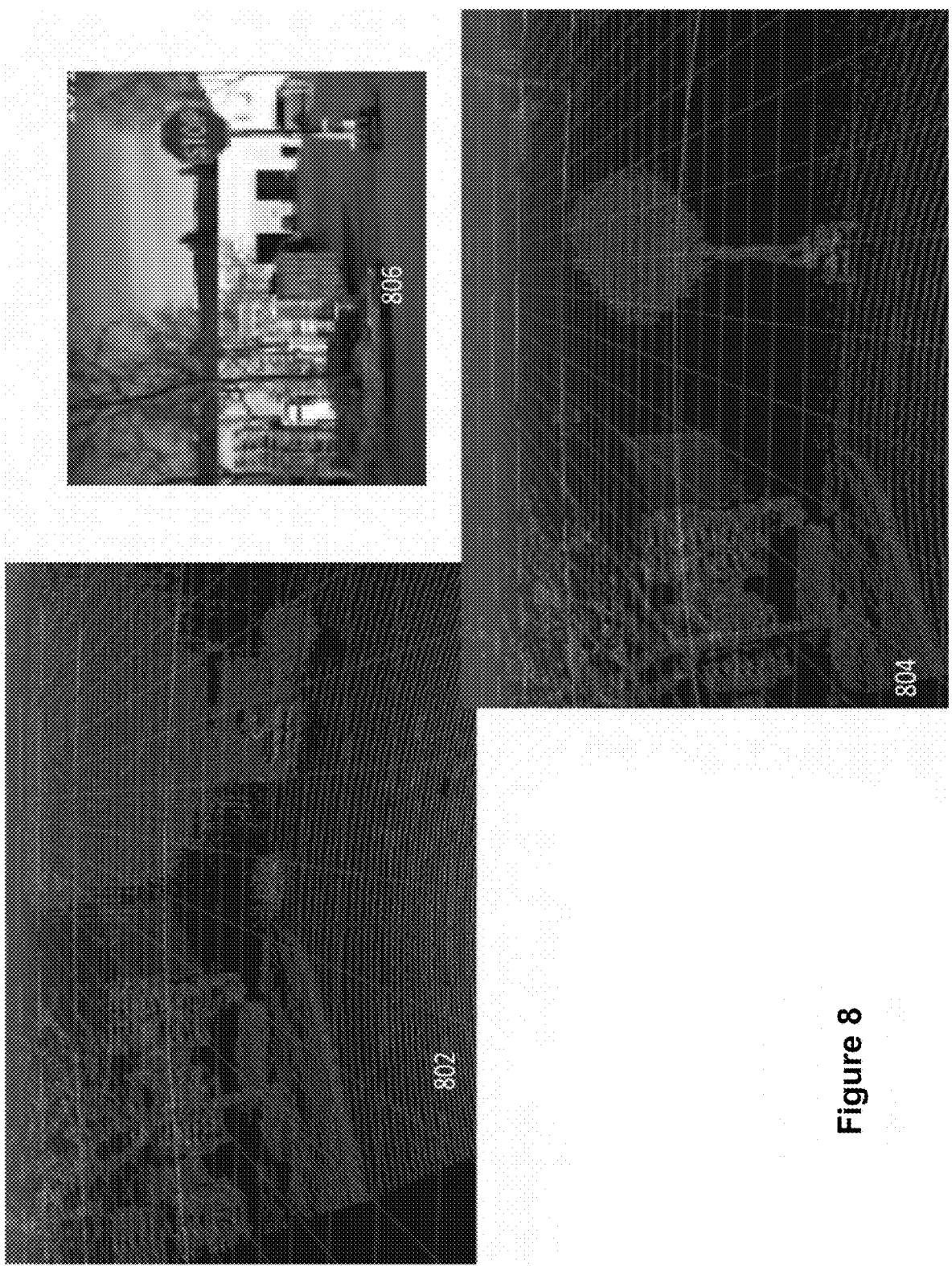
FIG. 8 shows examples of different ladar images that can be produced by ladar systems with and without a cross-receiver.

Another longer range example is shown in FIG. 8. 802 shows a single receiver and the existence of a large "shell" or Halo is visible around the stop sign which is retroreflective. 806 shows the scene from a color camera (co-bore sited with the camera) and 804 shows the effect of a bistatic receiver. While this example shows the benefits of bistatic collection for retro mitigation, it was obtained by modifying FIG. 4 so that 402 was polarization insensitive, and 404 was also polarization insensitive, but the latter was placed at a substantial distance, specifically one meter, away from the ladar source itself. Only data which shows up in both channels, namely exactly the procedure discussed in the threshold logic 452 description outlined earlier, is displayed in 804. The reason this simplified approach is effective is that the polarization return is highly directive, and hence the second channel does not see the polarized retro-return as long as this second receive channel is far enough away to avoid the retroreflective cone angle. The practitioner should be cautioned that this example embodiment is intended to work only for relatively short range offsets. In the example of FIG. 8, the offset sufficed up to about 50 meters.

We now present another example of how a non-polarization camera can nonetheless be useful for cueing a polarization ladar receiver, using color cueing. In the example discussed below, we use red as a cue that a highly reflective object is available for ladar interrogation.

Example Process Flow C for Down Selecting which Range Points to Interrogate in the Ladar Point Cloud Based on Analysis of the Passive Polarization Camera
1) Inspect the camera data (intensity RGB only) and identify red object.
2) Mark the associated Az, El for the identified red object in the shot list as shots likely to exhibit retro reflections in the return signal
3) Based on 2), apply the logic for block 108 in FIG. 4 to the shot return.

Passive Polarization for Point Cloud Augmentation:

MIT researchers have developed methods for creating 3D images from passive polarization cameras in indoor, controlled light, settings, an example of which is described by Kadambi, A. et al., "Polarized 3D: High Quality Depth Sensing with Polarization Cues", 2015 IEEE International Conference on Computer Vision (ICCV), Dec. 7-13, 2015, the entire disclosure of which is incorporated herein by reference. The inventors herein are unaware of this work being applied in an outdoor context or in conjunction with ladar.

FIG. 9A shows an example embodiment for point cloud enhancement using two passive non-bore sited polarized cameras, 914 (although only one shown for simplicity) linked to a ladar transceiver 906 (which includes both a ladar transmitter and ladar receiver).

The two cameras 914, which are embedded inside chassis 906, have lens pupils 918 which can be situated symmetrically about the laser pupil 916 (for sending ladar pulses and receiving ladar pulse returns). By triangulating, we can then identify at each range point sample the angle of the cameras 914 that corresponds to each range return from the laser. We can also have a full co-bore sited laser 904 (inside chassis 906 like the camera(s), but shown here in a blow-up expanded view for clarity) and camera 914, at the expense of more complicated optics. We assume that the camera alignment is sufficient to register camera 914 to laser 904, but cannot provide reliable depth information at range. It should be understood that the dual cameras 914 are only required to resolve parallax, i.e. align laser and camera, and can be substituted for a truly co-bore sited single camera if the practitioner desires.

The ladar transmit 938 and receive path for a point 922 on object 936 is shown as 940,942. We use "?" to indicate unknown values and "!" as measured values. The distance from the ladar system to said object point can be computed by the embedded processor situated inside the ladar transceiver 906 (e.g., see processor 454 in FIG. 4). Our goal in point cloud augmentation is to generate multiple points, one exemplar being 920, on object 936 with depth information as well as RGB information (if 914 is a color camera). 472a, 472b and 474a, 474b are the communication paths from the camera 914 to the processor 454, using the notation from FIG. 4. 946 is the normal vector of the surface at 922 ζ, 954, is the angle from the surface normal 946 of 922 and line of sight from the ladar system to 922. This normal bisects the angle formed for the line of sight from the ladar system to 922, and line from 922 to 956, the light source illuminating 922. We do not measure (directly but instead we measure 951, the (polarization) angle ζ'.

910 is the resulting range from the laser shot. Our specific goal is to find (i) the slope of the surface at 922, and subsequently (ii) the slope of other points on the object, such as 920, and finally (iii) the 3D position of all points on the object. We assume here that the material is polarization altering, but preserving some structure, i.e. specular or retro thereby being governed by Brewster angle effects.

Figure 9B:
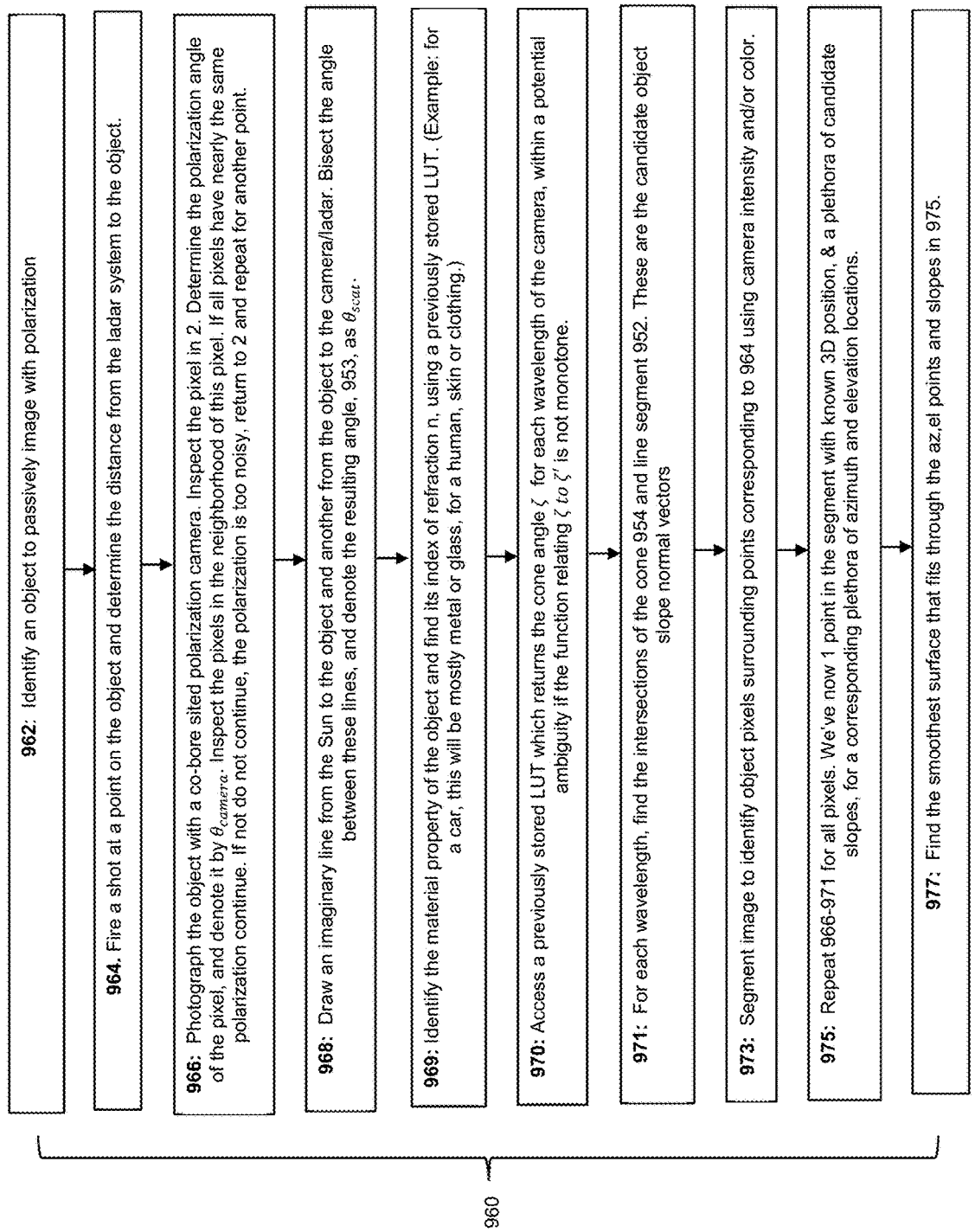
FIG. 9B shows an example process flow for the system of FIG. 9A.

FIG. 9B shows the data flow for the point cloud enhancement process (see 960). At step 962, we identify an object of interest (e.g., see 936 in FIG. 9A). At 964, a ladar shot is fired and range is extracted (see 910 in FIG. 9A). Next, at 966, a polarization image is obtained, and the pixel corresponding to the ladar shot is extracted (see 922 in FIG. 9A) to obtain a polarization (ξ', 951).

At 968, the angle from the wedge formed from this object to the sun, on one side, and object to the ladar is computed (e.g., see the angle formed by 916-922-902 in FIG. 9A). This is the scattering angle, $\theta_{scat}$ 953. We then find the material that the object is made of through pattern matching, and use a LUT to find the corresponding polarization transfer function (step 969). This is simplified by the fact that only a few items are generally necessary for autonomous safety (cars=metal, glass; humans=cloth, skin). Next, at 970, we use Brewster angle models and the Meridian polarization formula to compute the surface normal 946 for different assumed light source positions 956, which in turn yields a candidate ζ. Next at step 971 we find the best fit between candidate ζ and the measured value of ζ'. We then segment the image, at step 973, and repeat (see step 975), keeping in mind that pixels in the scene that have not been ladar-probed will have uncertain range, adding to uncertainty. Finally, at step 977, we use the smoothing techniques discussed in the above-referenced Kadambi paper to form a detailed point cloud by finding the best surface normal (and hence the orthogonality the best slopes) that smoothly fits our data.

Figure 9C:
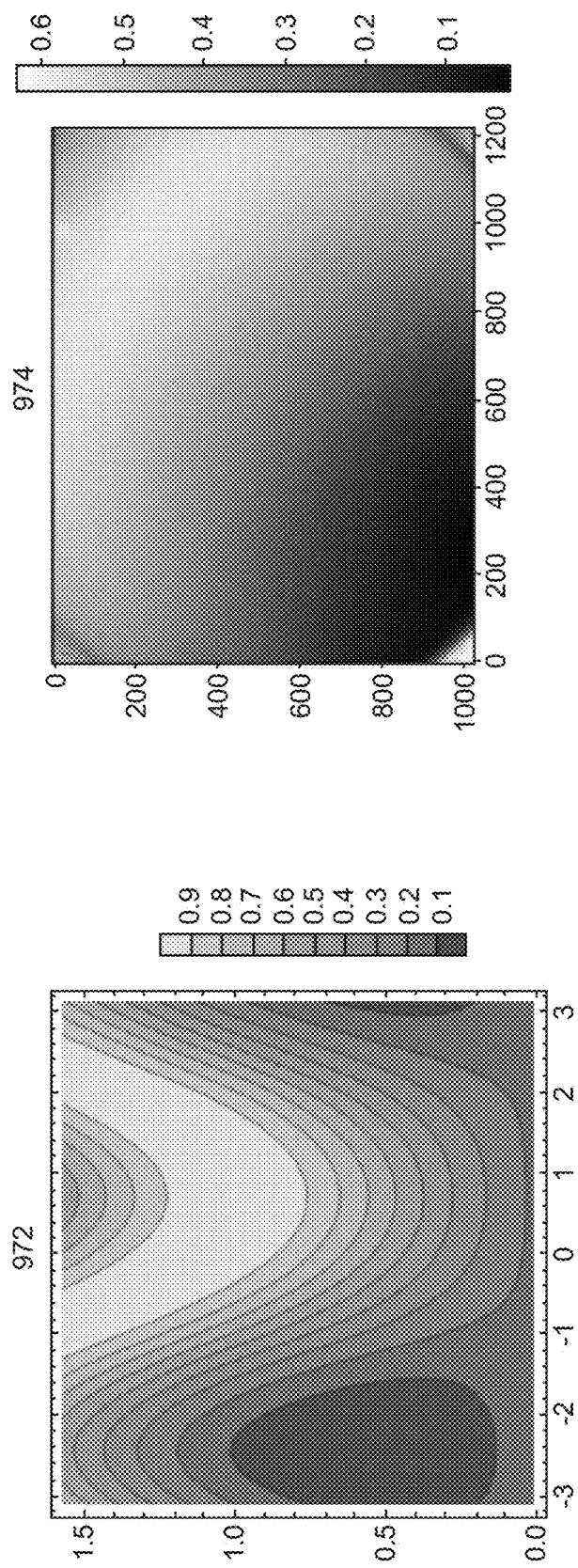
FIG. 9C shows examples of sky polarization maps (Rayleigh model) using data collected from a Sony polarization camera.

Image 976 in FIG. 9C shows the polarization as a function of camera pixel, for a Sony camera, with data generated at the AEye headquarters in Pleasanton, Calif. with the camera pointed upwards near ground normal, i.e. zenith, with polarization in radians. Image 974 in FIG. 9C shows an intensity map from the polarity camera, and we see the intensity grey scale is rather featureless, as expected. Image 972 in FIG. 9C shows the degree of polarization, after smoothing. This contour plot is close to the theoretical models found in textbooks.

The resulting polarization augmented point cloud can be transmitted to a machine learning perception system, and treated as if it derived from a denser point cloud using more ladar shots. In so doing the augmentation is not apparent to the end user, but truly behaves as if a more powerful ladar system, capable of generating a denser frame, were used at the onset.

In so doing the augmented point cloud can be used not only to reduce ladar cost, for a given performance level, but can also be configured to reduce latency for time critical operations, since passive collection does not require time to position shoot and collect laser pulse return light. In this case the augmented point cloud can be used to improve classification accuracy, thereby reducing latency for high confidence motion planning decision-making.

III. Retro Reflection and Background Light Rejection Using a Cross-Receiver

Figure 7A:
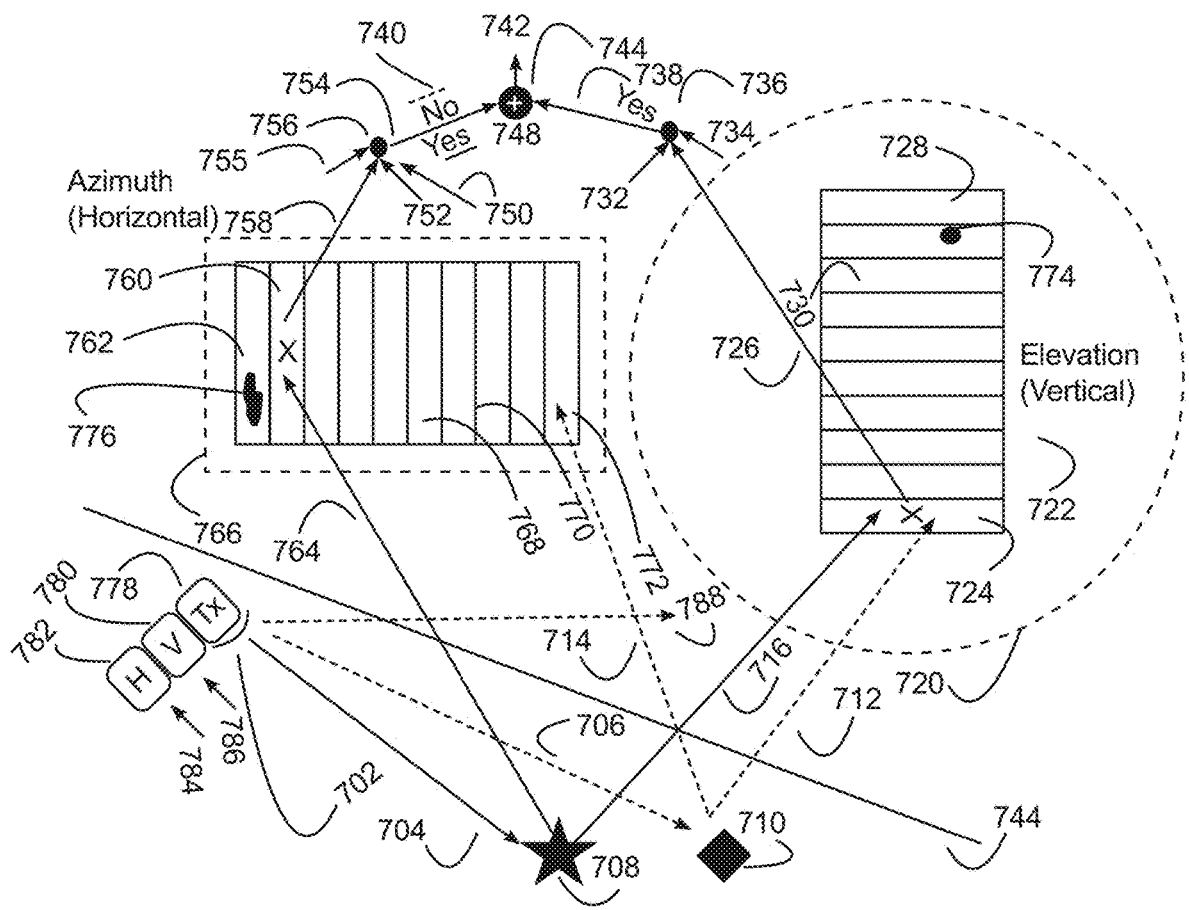
FIG. 7A shows an example embodiment for a ladar system that includes a cross-receiver.

FIG. 7A shows an example embodiment of the cross receiver concept. The cross receiver embodiment is motivated by a desire to obtain the kind of isolation of a two dimensional photodetector array at a small fraction of the cost.

To begin we consider the ladar system, which includes two receivers 782, 780, and a transmitter 778. The transmitter 778 includes a laser source, and may also include an optical collimating lens, either fixed or scanning, with the lens either fiber-coupled or free space-coupled to the laser source. The transmitter 778 is shown in more detail at the top FIG. 7A, above line 744. The receivers 782,780 will receive ladar returns 786 and 784 from laser beams that are transmitted from the transmitter 778, after passing through the lens 702, where lens 702 is used to create a focused beam indicated by the light ray 704. This ray 704 then falls upon either a desired target 708 (shown as a star) or a retro reflector 710 (shown as a diamond), such as is the geometry of certain road signs. Road signs are typically made of retroreflective paint to make them more visible when illuminated by headlights at night. We show the retro light path as dashed, 706, 712, 714, 788 and the desired target as solid, 764, 716, 704.

The top of FIG. 7A shows the two receivers 766,720 that form the cross-receiver. The horizontal receiver (Azimuth) is labeled 766, and the vertical receiver (Elevation) is labeled 720. These are the blow up of the receivers 786, 784 in the bottom of FIG. 7A; and 786 and 784 are simplified versions of the more elaborate paths 706,712,714,788,764, 716,704 that we now describe in more detail.

To trace the data flow in a cross receiver, first, we note that the solid paths from the target are only two-fold, one travels to the azimuth receiver 766, arriving at cell 760, and one travels to the elevation receiver 720, arriving at cell 724.

Next we note that the dotted paths from the retro reflector are also two-fold, one travels to the azimuth receiver 766, arriving at cell 772, and one travels to the elevation receiver 720, arriving at cell 724. The third dotted line 788 hits neither receivers nor the retro retroreflector. The reason that there are paths from the laser source to the retro reflector and from the laser source to nowhere in particular (788) (in fact there are many more, but FIG. 7A does show them for ease of illustration) is that the retro reflector return is so large that it responds to miniscule amounts of light outside the major, i.e. intended, beam from the laser 704. This sidelobe light is what produces the halos as we find in images (e.g., see FIG. 6B).

Note that the 1D photodetector arrays 720 and 766 may have cells that are rectangular. This is desirable because the asymmetric shape allows for more light collection while keeping the aspect ratio of the overall array fairly symmetric, which helps in optics design. 1D photodetector arrays are common in bar code readers and industrial inspection, where the second dimension is obtaining from object motion. However, the use of a 1D photodetector array can be problematic in a ladar system because of the fact that retro reflectors can cause confusion, as we show in FIG. 7A by the fact that cell 724 absorbs light from both desired return and the undesired retro reflector return. To resolve this ambiguity, the example of FIG. 7A employs the second 1D photodetector array in a cross-receiver arrangement.

The dotted lines forming the boundaries of the cross receivers 766 and 720 can be, respectively, anamorphic and spherical lenses. Spherical lenses are preferred because they have more light collection, but they are not always available, depending on the aspect ratio and scan angle desired for the receiver. Anamorphic lenses are available from many vendors including Edmond Optics, and spherical lenses (or aspherical lenses which are similar and have symmetric profiles) are ubiquitous amongst optical merchants.

The receive optics for the ladar receiver have the property that they focus incoming light onto a cell of each of the receivers 720 and 766, as shown respectively as 774, 776. At any point in time most (if not all) the cells will be splattered with numerous spots; so actually instead of just two spots 774,776 as shown by FIG. 7A for ease of illustration, we will have a plethora of spots across all cells. However, the desired target will only show up on a single spot on both receivers. The specific cell which the spot lands on can be known beforehand. This is because the spot's cell location is determined by the azimuth and elevation where the shot was fired. This knowledge means that only one cell from the Vertical and one cell from the Horizontal need to be read out for each shot. To simplify the illustration, we do not include the beam spots from all the cells, but we recognize that 774 and 776 show spots from background light and spots on 724 and 760 for the target (star 708) return shown as well as "X". Note that in addition to being able to collect more light, the spherical (aspherical) lens for receiver 720 gives a more symmetric and tighter beam, in contrast to the anamorphic lens of receiver 764 (compare the beam spot on cell 776 versus the beam spot on cell 774). Regardless in both cases the lens crafter will create an optical engine (single or composite primitive lenses) that focuses a spot for any laser return onto one cell, or nearly all onto one cell, except in the rare case that the spot is at the very edge (e.g., see 770) of a cell. In such a case reading out two cells may be desired.

Each cell in each 1D array can be provisioned with a photodetector circuit that converts light to current and amplifies this current. The 1D array can also include a MUX circuit, in communication with the transmitter 778. This MUX circuit can be provisioned so that the direction 704 that the laser is fired is shared with said MUX circuit, and the MUX circuit can be provisioned with a look up table (LUT) that directs it to select which cell to access from each 1D array based on the laser direction or targeted range point.

For elevation, we see that there is a read 726 of a cell selected by the elevation 1D array MUX 736. Other cell currents (e.g., 732, 734) are ignored. For ease of illustration we do not show the pathways to these non-accessed MUX lines, but the associated cells are shown notionally by inactive cells 730 and 728.

The MUX circuit is then in electrical communication with a detection circuit 740. Detection circuit 740 includes a comparator within 736 that compares the current output 726 from the MUX with a threshold (after any desired waveform conditioning such as matched filtering and possible channel combining as described in FIG. 7B) resulting in a YES or NO (decision) about the presence of a ladar return at the selected cell at the range in question. This binary yes/no decision is shown as 738 in FIG. 7A.

This process is repeated for the Azimuthal 1D array 766, where MUX circuit 756 selects mux line 758 which accesses cell 760 which contains amplified current from target return 764. The MUX circuit 756 rejects other MUX lines (e.g., see 755 and 752) which correspond to cells, nominally, 768, 762. Note also that the MUX circuit also rejects MUX line 750, which corresponds to cell 772 which contains the return from the retro reflector. MUX circuit 756 can also include a comparator that performs the threshold comparison as discussed above in connection with MUX circuit 736. The threshold comparison results in a binary output that declares a target return presence (solid line) while effectively rejecting the retro reflector presence (dotted line) due to the non-selection of the mux line from the cell that received the retro reflector return.

Finally, the decisions resulting from 736 and 756 (each a binary state, e.g., 0 for no; 1 for yes) are fed into a binary adder 748. The presence of a ladar pulse return from the target is declared if both inputs to the adder 748 yield a detection (in this example, if 742 equals two). If so, this target return presence detection indicator is passed to the user or consuming application along with ancillary information, range, intensity, RGB, polarization etc., when available.

In this example shown by FIG. 7A, the Azimuth receiver 766 correctly rejected the retro reflector but the Elevation receiver 720 did not. It can be recognized upon reflection that the ONLY case where the retro reflector is NOT properly rejected is if the retro reflector and target produce returns in the same exact cell in both azimuth and elevation, an exceedingly rare situation that would quickly vanish as the relative geometry changed during subsequent range point collections. This is why we refer to the receiver architecture of FIG. 7A as a cross receiver; it creates a virtual 2D array by means of the intersection (cross) of two one dimensional photodetector cell arrays. The downside of this architecture is primarily the need for two lenses, as opposed to one for a full 2D receiver, as well as the presence of more background light that will interfere with the ladar system and reduce sensitivity. However, this is in many cases an attractive trade.

Note that the target spot sizes 774, 776 are generally much smaller than the cell area (e.g., 728,730, etc.) of the photodetector cells of the 1D arrays. In an example embodiment, in order to obtain improved target angular accuracy, the lens can be constructed so that there is optical gain variation in each cell of the 1D array, so as to make the measurement in the cells sensitive to angle changes. We can construct an optical gain gradient (convex or Gaussian or other shape) on the lens so that there is a change in current produced based on where the spot lies on a cell. This is shown in the enlarged cell 790 of FIG. 7C. Rings 792, 798, and 718 correspond to constant contours of current induced for a fixed optical flux density. So, for example, if the spot is located at position 796 then we know that the object lies along ring 718, as long as we know the input flux (which we can estimate using the presence of dual receivers). Repeating this for both 1D cross receiver arrays, and using a lookup table (LUT) which stores the contour values, we can pinpoint the spot location using Venn diagram or other fusion concepts. Since we know the shot angles in azimuth and elevation, we known the centerline, or centroid, 794 for a laser shot. If the spot is computed to lie within a beam divergence of 794 we know that the target is valid, and furthermore we have improved its angular positional accuracy. On the other hand, if the spot position is determined to lie further than the beam divergence would dictate is viable for a valid shot, then we can reject the return as a retro reflector or laser interference spot. We can summarize this improved angle accuracy and retro-detection as follows:

1. The optical gain variation on each cell is measured, either at factory, or from dynamic updates based on measurements against fiducials.

2. Based on this previously measured data from 1 above, the controller generates a look up table, LUT, so that the optical gain is stored for each azimuth and elevation angle of an incident light ray impinging on the cells accessed on both 1D arrays.

3. A shot is fired; and if/when a detection occurs, the LUT from 2 above is employed to ascertain the azimuth and elevation of the detected pulses.

4. The actual centerline azimuth and elevation where the laser was pointed when the shot took place is recorded.

5. The difference is computed between the measured azimuth and elevation obtained from 3 above and the actual centerline from 4 above.

6. The full width half maximum point spread of the ladar beam is accessed from memory (having been premeasured).

7. If the difference from 5 above exceeds the point spread from 6 above, the detection is deemed invalid (it is deemed either a retro reflection sidelobe leakage or laser interference)

8. If the difference from 5 above is equal to or is exceeded by the point spread from 6 above, then the detection is deemed valid.

9. If the detection is deemed valid, the measured azimuth and elevation is used in lieu of the range point shot centerline, thereby furnishing an enhanced resolution pulse.

In another embodiment, the cross receiver performance can be improved if multiple cells are configured to be read for a single range point. In such an embodiment, each of the 1D arrays in the cross receiver can be configured so that in addition to accessing the row and column entries corresponding to the range point fired, one or both adjacent cells are accessed as well. This allows for improved angle accuracy (as described in the above-referenced and incorporated US Pat App Pub. 2019/0086514—see also the above-referenced and incorporated U.S. Pat. No. 9,933,513). This allows multiple shots to be fired at different angles and collected simultaneously increasing the shot rate of the system.

In an example embodiment, one of the receivers (say, for example, Horizontal) has high gain optically and the other receiver (say, for example, Vertical) has low gain optically. This can be desirable because the low gain will be far less expensive, nearly cutting the receiver cost in half. Such a cost savings is viable because only one receiver needs to be high gain for detection. Once detection has been accomplished, a lower gain (and therefore lower SNR) complementary cross receiver is often viable since to accept or reject a target is generally viable at much lower SNR than the initial detection per se. If different optical gains are employed, different thresholds will be required to balance the outputs before applying the detection logic. For example, if Horizontal gain is double the vertical gain, we must halve the vertical channel data's threshold for detection.

In one such embodiment, the low optical gain 1D array component of the cross receiver can be safely ignored for a predetermined (low) SNR. This reduces the false acceptance of targets when one has weak returns, and is thus ignorant about whether the low gain channel has pure noise or a small amount of retro return. The state of ignoring the low gain channel can, for example, be achieved without adding circuit complexity by setting the detection threshold for the 1D array to a radiometrically unapproachably large number.

Figure 7B:
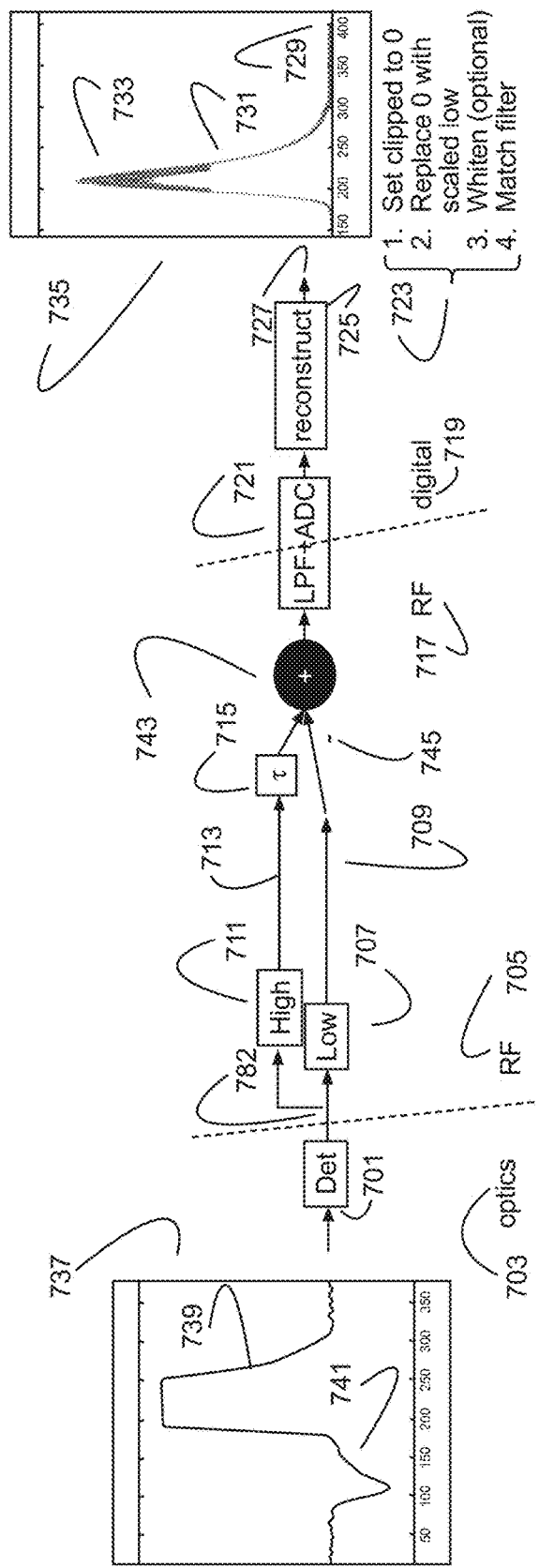
FIG. 7B shows an example embodiment for improving the dynamic range of a cross receiver.
Figure 7C:
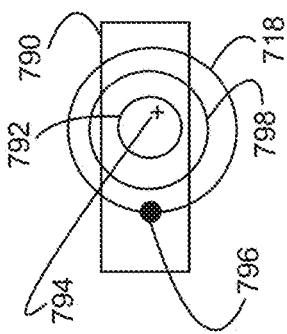
FIG. 7C shows how an optical gain gradient can be applied using a lens and photodetector cell so that there is a change in current produced based on where a beam spot lies on a cell.

FIG. 7B discloses a technique for improving the dynamic range of the cross receiver, beyond that available in an analog to digital converter, by using a delay and MUX circuit. We begin with light arriving on a cell, which is converted by the detector/transducer 701 which takes optical energy in the optical domain 703 and creates corresponding current in the radio frequency (RF) domain 705, typically in the GHz range. We do not show the MUX here for simplicity, but consider that 782 is the output of the MUX (e.g., see MUXes 756 and 736 in FIG. 7A) prior to detection, and still expressed as analog current after the optical detector in the optics domain 703.

This current is now again amplified after splitting into a high and a low gain amplification pair of parallel paths, as shown as 707, 711, which are then summed by adder 743 (while still in analog RF domain 717), after (1) one channel is reversed in polarity by polarity reverser 745 and (2) the other channel is delayed by delay element 715). It is immaterial which channel is polarized and which channel is delayed, so any permutation will do.

Next, the system migrates from RF to the digital domain via a low pass filtering (LPF) and analog-to-digital converter (ADC), as shown as 721. As shown, the digital boundary 719 resides within 721. Our goal is to obtain more bits of accuracy than the ADC normally allows, using what is essentially a variant of compressive sensing as described in the above-referenced and incorporated U.S. Pat. No. 10,078, 133.

At the output of 721, we obtain a pulse that looks like the plot shown in 737. The high gain channel is shown by 739, which is found to be clipped because the ADC dynamic range has been exceeded, but where the missing "tip" of the pulse is still "alive" in the reversed low gain channel 741. Note that the tip 741 looks shrunk relative to its base, which is the result of the top and bottom of the pulse being digitized at different effective quantization levels. Therefore, we can view this scheme as a non-uniform quantization process, similar to a log amplifier, but operating at much higher bandwidth because the complexity is placed in the analog domain rather than the digital domain.

The system next recombines the negative and positive pulses, renormalizing to a common scale, in a digital reconstruction stage 725 to produce the final output 727. Plot 735 shows an example of the output 727. The steps involved are summarized in 723. First, the system replaces signal values at the ADC output that lie below zero with their sign inverse, overriding any positive quantity in the process (steps 1,2). Next, the logic performs an optional whitening operation to erase spectral shaping from the feedback circuit in the 1D receiver. Then, the logic applies a match filter, matched to the true pulse that would be obtained if the ADC was perfect, i.e. had no quantization noise. By adjusting how many bits to allocate to the negative portion of the pulse, the gain differential between high gain and low gain can be used to create an effective nonlinear (pseudo-logarithmic) quantization level digital converter. The pulse in plot 735 is shown as a superposition of 100 random trials. The tip 733 is now apparent (the clipping from high gain channel 739 shown in plot 737 is no longer apparent). The variation in the tip 733, as opposed to the lack of variation in the skirts 731, is because the low gain channel has less effective resolution. The noise has larger variance 729, so we see that the lowest amplitude of the pulse has low SNR, the midrange skirt higher SNR, and the tip has a lower SNR.

While the invention has been described above in relation to its example embodiments, various modifications may be made thereto that still fall within the invention's scope. Such modifications to the invention will be recognizable upon review of the teachings herein.

What is claimed is:

1. A ladar system comprising:
   a camera that senses background light levels, wherein the camera comprises at least one of a passive infrared camera, a visible light camera, and/or a visible light color camera;
   a control circuit that (1) estimates the sensed background light levels, (2) maintains a plurality of solar thermal mass models for use when estimating background light levels, and (3) controllably adjusts a pulse duration for a new ladar pulse based on the estimated background light levels; and
   a ladar transmitter that transmits the new ladar pulse, wherein the new ladar pulse has the adjusted pulse duration.

2. A ladar system comprising:
   a sensor that senses background light levels;
   a control circuit that (1) measures the sensed background light levels and (2) controllably adjusts a pulse duration for a new ladar pulse based on the measured background light levels; and
   a ladar transmitter that transmits a plurality of ladar pulses, including the new ladar pulse, wherein the new ladar pulse has the adjusted pulse duration, wherein the ladar transmitter comprises (1) a laser and (2) a pulse generator that is responsive to a control signal from the control circuit to control the pulse duration for ladar pulses; and
   wherein the pulse generator can adjust pulse duration commensurate with an inter-pulse period between ladar pulses for the ladar transmitter.

3. The system of claim 1 wherein the control circuit adjusts the pulse duration by defining a first pulse duration for measured background light levels corresponding to a first amount and defining a second pulse duration for measured background light levels corresponding to a second amount, wherein the first amount is brighter than the second amount, and wherein the first pulse duration is shorter than the second pulse duration.

4. The system of claim 1 wherein the control circuit adjusts the pulse duration so that background light noise is below or near a Johnson noise for the ladar system with respect to a threshold.

5. The system of claim 1 further comprising a ladar receiver that detects ladar returns from ladar pulses transmitted by the ladar transmitter.

6. The system of claim 5 wherein the ladar transmitter and the ladar receiver are in a bistatic arrangement.

7. The system of claim 6 wherein the ladar receiver is spatially offset from the ladar transmitter, and wherein the ladar receiver has a field of view in a range between −30 degrees to +30 degrees.

8. The system of claim 5 wherein the ladar receiver is dark current shot noise limited, background light limited, and/or Johnson noise limited.

9. The system of claim 8 wherein the control circuit detects ladar returns extant above the measured background light levels and a shot noise background.

10. The system of claim 5 wherein the ladar receiver has a receiver aperture that is larger than an aperture of the ladar transmitter.

11. The system of claim 5 wherein the ladar receiver comprises a non-imaging ladar receiver.

12. The system of claim 5 wherein the ladar receiver comprises a plurality of photo-receivers, each with a different field of view, and wherein the ladar receiver is configured to selectively activate different photo-receivers in response to a control signal from the control circuit.

13. The system of claim 12 wherein the control signal activates photo-receivers based on which photo-receivers have a field of view that encompasses a range point targeted by a ladar pulse.

14. The system of claim 12 wherein the ladar receiver includes a multiplexer circuit that selectively activates the photo-receivers in response to the control signal.

15. The system of claim 12 wherein the photo-receivers comprise an array of addressable photodetectors.

16. The system of claim 5 wherein the ladar receiver comprises a bandpass optical filter and a photo-receiver that receives incident light via the bandpass optical filter.

17. The system of claim 5 wherein the ladar receiver comprises a near field coaxial receiver.

18. The system of claim 5 wherein the ladar receiver comprises:
   a first receiver that receives a ladar return from a ladar pulse with a known transmit polarization, wherein the first receiver is polarized with a first polarization;
   a second receiver that receives the ladar return from the ladar pulse with the known transmit polarization, wherein the second receiver is polarized with a second polarization; and
   wherein the control circuit (1) measures incident polarizations at the first and second receivers with respect to the received ladar return and (2) separates a retro-reflective portion of the received ladar return from a non-retro-reflective portion of the received ladar return based on the measured incident polarization and the known transmit polarization.

19. The system of claim 18 wherein the first receiver comprises (1) a first lens polarized with the first polarization, and (2) a first photo-receiver that receives incident light via the first lens; and
   wherein the second receiver comprises (1) a second lens polarized with the second polarization, and (2) a second photo-receiver that receives incident light via the second lens.

20. The system of claim 18 wherein the first polarization is horizontal polarization, and wherein the second polarization is vertical polarization.

21. The system of claim 5 wherein the ladar receiver comprises a cross-receiver, the cross-receiver comprising a first 1D array of photodetector cells and a second 1D array of photodetector cells that are oriented differently relative to each other.

22. The system of claim 1 wherein the camera comprises a plurality of cameras.

23. The system of claim 22 wherein the control circuit employs parallax correction based on the cameras.

24. The system of claim 1 wherein the ladar transmitter comprises (1) a laser and (2) a pulse generator that is responsive to a control signal from the control circuit to control the pulse duration for ladar pulses.

25. The system of claim 24 wherein the pulse generator can adjust pulse duration commensurate with an inter-pulse period between ladar pulses for the ladar transmitter.

26. The system of claim 1 wherein the control circuit controls the ladar transmitter to generate and transmit a plurality of ladar pulses that share the same pulse energy but differ in pulse duration.

27. The system of claim 1 wherein the control circuit comprises a processor.

28. The system of claim 2 wherein the control circuit adjusts the pulse duration by defining a first pulse duration for measured background light levels corresponding to a first amount and defining a second pulse duration for measured background light levels corresponding to a second amount, wherein the first amount is brighter than the second amount, and wherein the first pulse duration is shorter than the second pulse duration.

29. The system of claim 2 wherein the control circuit adjusts the pulse duration so that background light noise is below or near a Johnson noise for the ladar system with respect to a threshold.

30. The system of claim 2 further comprising a ladar receiver that detects ladar returns from ladar pulses transmitted by the ladar transmitter.

31. The system of claim 30 wherein the ladar transmitter and the ladar receiver are in a bistatic arrangement.

32. The system of claim 31 wherein the ladar receiver is spatially offset from the ladar transmitter, and wherein the ladar receiver has a field of view in a range between −30 degrees to +30 degrees.

33. The system of claim 30 wherein the ladar receiver is dark current shot noise limited, background light limited, and/or Johnson noise limited.

34. The system of claim 33 wherein the control circuit detects ladar returns extant above the measured background light levels and a shot noise background.

35. The system of claim 30 wherein the ladar receiver has a receiver aperture that is larger than an aperture of the ladar transmitter.

36. The system of claim 30 wherein the ladar receiver comprises a non-imaging ladar receiver.

37. The system of claim 30 wherein the ladar receiver comprises a plurality of photo-receivers, each with a different field of view, and wherein the ladar receiver is configured to selectively activate different photo-receivers in response to a control signal from the control circuit.

38. The system of claim 37 wherein the control signal activates photo-receivers based on which photo-receivers have a field of view that encompasses a range point targeted by a ladar pulse.

39. The system of claim 37 wherein the ladar receiver includes a multiplexer circuit that selectively activates the photo-receivers in response to the control signal.

40. The system of claim 37 wherein the photo-receivers comprise an array of addressable photodetectors.

41. The system of claim 30 wherein the ladar receiver comprises a bandpass optical filter and a photo-receiver that receives incident light via the bandpass optical filter.

42. The system of claim 30 wherein the ladar receiver comprises a near field coaxial receiver.

43. The system of claim 30 wherein the ladar receiver comprises:
- a first receiver that receives a ladar return from a ladar pulse with a known transmit polarization, wherein the first receiver is polarized with a first polarization;
- a second receiver that receives the ladar return from the ladar pulse with the known transmit polarization, wherein the second receiver is polarized with a second polarization; and
- wherein the control circuit (1) measures incident polarizations at the first and second receivers with respect to the received ladar return and (2) separates a retro-reflective portion of the received ladar return from a non-retro-reflective portion of the received ladar return based on the measured incident polarization and the known transmit polarization.

44. The system of claim 43 wherein the first receiver comprises (1) a first lens polarized with the first polarization, and (2) a first photo-receiver that receives incident light via the first lens; and
wherein the second receiver comprises (1) a second lens polarized with the second polarization, and (2) a second photo-receiver that receives incident light via the second lens.

45. The system of claim 43 wherein the first polarization is horizontal polarization, and wherein the second polarization is vertical polarization.

46. The system of claim 30 wherein the ladar receiver comprises a cross-receiver, the cross-receiver comprising a first 1D array of photodetector cells and a second 1D array of photodetector cells that are oriented differently relative to each other.

47. The system of claim 2 wherein the sensor comprises a camera.

48. The system of claim 47 wherein the camera comprises at least one of a passive infrared camera, a visible light camera, and/or a visible light color camera.

49. The system of claim 47 wherein the camera comprises a plurality of cameras.

50. The system of claim 49 wherein the control circuit employs parallax correction based on the cameras.

51. The system of claim 2 wherein the control circuit controls the ladar transmitter to generate and transmit a plurality of ladar pulses that share the same pulse energy but differ in pulse duration.

52. The system of claim 2 wherein the control circuit comprises a processor.

* * * * *